(12) United States Patent
Okada et al.

(10) Patent No.: US 7,934,737 B2
(45) Date of Patent: May 3, 2011

(54) STEP DEVICE FOR VEHICLE

(75) Inventors: Hiroki Okada, Okazaki (JP); Ryoichi Fukumoto, Nagoya (JP); Seiichi Suzuki, Nishikamo-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 263 days.

(21) Appl. No.: 12/377,069

(22) PCT Filed: Nov. 6, 2007

(86) PCT No.: PCT/JP2007/071517
§ 371 (c)(1),
(2), (4) Date: Feb. 10, 2009

(87) PCT Pub. No.: WO2008/056644
PCT Pub. Date: May 15, 2008

(65) Prior Publication Data
US 2009/0309325 A1 Dec. 17, 2009

(30) Foreign Application Priority Data
Nov. 7, 2006 (JP) .................................. 2006-301863

(51) Int. Cl.
*B60R 3/02* (2006.01)
(52) U.S. Cl. ...................................... 280/166; 280/163
(58) Field of Classification Search .................. 280/163, 280/166, 164.1
See application file for complete search history.

(56) References Cited

U.S. PATENT DOCUMENTS

| | | | |
|---|---|---|---|
| 5,090,715 A | 2/1992 | Nakajima et al. | |
| 6,325,397 B1 * | 12/2001 | Pascoe et al. | 280/166 |
| 6,375,207 B1 * | 4/2002 | Dean et al. | 280/166 |
| 6,406,045 B1 | 6/2002 | Farkash | |
| 6,612,596 B2 | 9/2003 | Jeon et al. | |

(Continued)

FOREIGN PATENT DOCUMENTS

JP 57-134979 U 8/1982

(Continued)

OTHER PUBLICATIONS

International Search Report issued in PCT/JP2008/070651 (Published as WO 2009/066601 A1), Feb. 17, 2009, Japanese Patent Office, JP.

(Continued)

*Primary Examiner* — Jeffrey J Restifo
(74) *Attorney, Agent, or Firm* — Buchanan Ingersoll & Rooney PC

(57) ABSTRACT

A step device for a vehicle including a movable step arranged in a doorway opened and closed by a door is disclosed. The step device includes a drive unit, an open/close mechanism, a projection/retraction mechanism, and a plate cam. The open/close mechanism opens or closes the slide door. The projection/retraction mechanism moves a movable step. The plate cam is rotated by the open/close mechanism and engaged with a bushing arranged on the projection/retraction mechanism to enable or disable power transmission between the open/close mechanism and the projection/retraction mechanism. The plate cam includes a first recess and a second recess. The first recess pushes the bushing during rotation of the plate cam when the slide door is in a range of a predetermined open/close position to enable or disable power transmission between the open/close mechanism and the projection/retraction mechanism. The second recess frees the bushing from the pushing during rotation of the plate cam and disables power transmission between the open/close mechanism and the projection/retraction mechanism when the slide door is outside the range of the predetermined open/close position.

8 Claims, 20 Drawing Sheets

U.S. PATENT DOCUMENTS

| | | | |
|---|---|---|---|
| 6,641,158 B2 * | 11/2003 | Leitner | 280/166 |
| 6,659,485 B2 | 12/2003 | Ueno | |
| 6,830,257 B2 * | 12/2004 | Leitner | 280/166 |
| 6,926,295 B2 * | 8/2005 | Berkebile et al. | 280/166 |
| 6,938,909 B2 * | 9/2005 | Leitner | 280/166 |
| 6,942,233 B2 * | 9/2005 | Leitner et al. | 280/166 |
| 6,955,370 B2 * | 10/2005 | Fabiano et al. | 280/163 |
| 7,007,961 B2 * | 3/2006 | Leitner et al. | 280/166 |
| 7,055,839 B2 * | 6/2006 | Leitner | 280/166 |
| 7,111,859 B2 | 9/2006 | Kim | |
| 7,118,120 B2 * | 10/2006 | Lee et al. | 280/166 |
| 7,163,221 B2 * | 1/2007 | Leitner | 280/166 |
| 7,287,771 B2 * | 10/2007 | Lee et al. | 280/166 |
| 7,318,596 B2 * | 1/2008 | Scheuring et al. | 280/166 |
| 7,377,531 B2 | 5/2008 | Fabiano et al. | |
| 7,380,807 B2 * | 6/2008 | Leitner | 280/166 |
| 7,398,985 B2 * | 7/2008 | Leitner et al. | 280/166 |
| 7,413,204 B2 * | 8/2008 | Leitner | 280/163 |
| 7,445,221 B2 * | 11/2008 | Kobayashi | 280/166 |
| 7,469,916 B2 | 12/2008 | Watson | |
| 7,487,986 B2 * | 2/2009 | Leitner et al. | 280/166 |
| 7,566,064 B2 * | 7/2009 | Leitner et al. | 280/166 |
| 7,584,975 B2 * | 9/2009 | Leitner | 280/166 |
| 7,712,755 B2 * | 5/2010 | Yang et al. | 280/163 |
| 2004/0100063 A1 * | 5/2004 | Henderson et al. | 280/166 |
| 2004/0108678 A1 * | 6/2004 | Berkebile et al. | 280/166 |
| 2005/0258616 A1 * | 11/2005 | Scheuring et al. | 280/166 |
| 2006/0163836 A1 * | 7/2006 | Kobayashi | 280/166 |
| 2008/0191445 A1 * | 8/2008 | Yang et al. | 280/166 |
| 2008/0224438 A1 * | 9/2008 | Okada et al. | 280/163 |
| 2008/0238019 A1 | 10/2008 | Okada et al. | |
| 2008/0238020 A1 * | 10/2008 | Okada et al. | 280/166 |
| 2009/0295114 A1 * | 12/2009 | Yang et al. | 280/166 |
| 2009/0295115 A1 * | 12/2009 | Yang et al. | 280/166 |
| 2009/0309325 A1 * | 12/2009 | Okada et al. | 280/166 |
| 2010/0059962 A1 * | 3/2010 | Leitner et al. | 280/166 |
| 2010/0140897 A1 * | 6/2010 | Yang et al. | 280/166 |
| 2010/0164197 A1 | 7/2010 | Okada et al. | |
| 2010/0194070 A1 * | 8/2010 | Stauffer et al. | 280/166 |

FOREIGN PATENT DOCUMENTS

| | | |
|---|---|---|
| JP | 58-104750 U | 7/1983 |
| JP | 60-58555 | 4/1985 |
| JP | 60-058556 U | 4/1985 |
| JP | 62-099456 U | 6/1987 |
| JP | 62-125641 U | 8/1987 |
| JP | 62-125642 U | 8/1987 |
| JP | 62-150243 U | 9/1987 |
| JP | 63-149244 A | 6/1988 |
| JP | 3-033744 U | 4/1991 |
| JP | 4-003870 Y2 | 2/1992 |
| JP | 8-230526 A | 9/1996 |
| JP | 9-188197 A | 7/1997 |
| JP | 11-011218 A | 1/1999 |
| JP | 2003-072466 A | 3/2003 |
| JP | 2003-127776 A | 5/2003 |
| JP | 2004-114957 A | 4/2004 |
| JP | 2004-124446 A | 4/2004 |
| JP | 2004-175339 A | 6/2004 |
| JP | 2004-216060 A | 8/2004 |
| JP | 2007-022143 A | 2/2007 |
| JP | 2007-022144 A | 2/2007 |
| WO | WO 2008/133266 A1 | 11/2008 |

OTHER PUBLICATIONS

Form PCT/ISA/210 (International Search Report) dated Dec. 4, 2007.

English translation of International Preliminary Report on Patentability (Form PCT/IB/373) and Written Opinion (Form PCT/ISA/237) issued Jun. 8, 2010 in International Application No. PCT/JP2008/070651.

English translation of International Preliminary Report on Patentability issued on May 26, 2009 in corresponding International Application No. PCT/JP2007/071517.

* cited by examiner

Fig.21
(a)
(b)
(c)
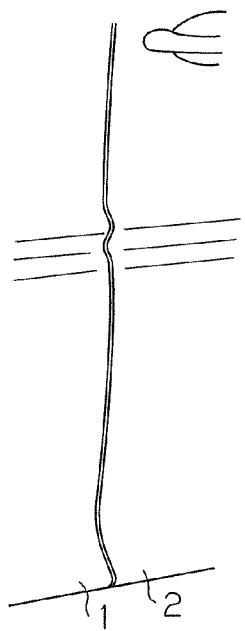
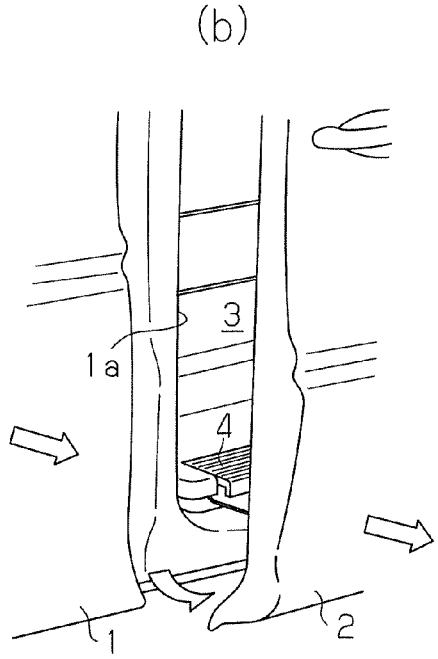
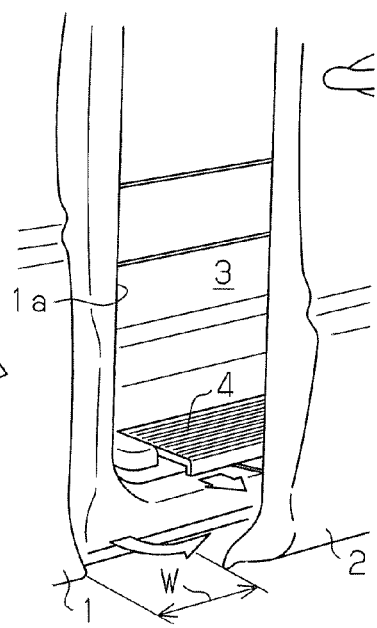
(d)
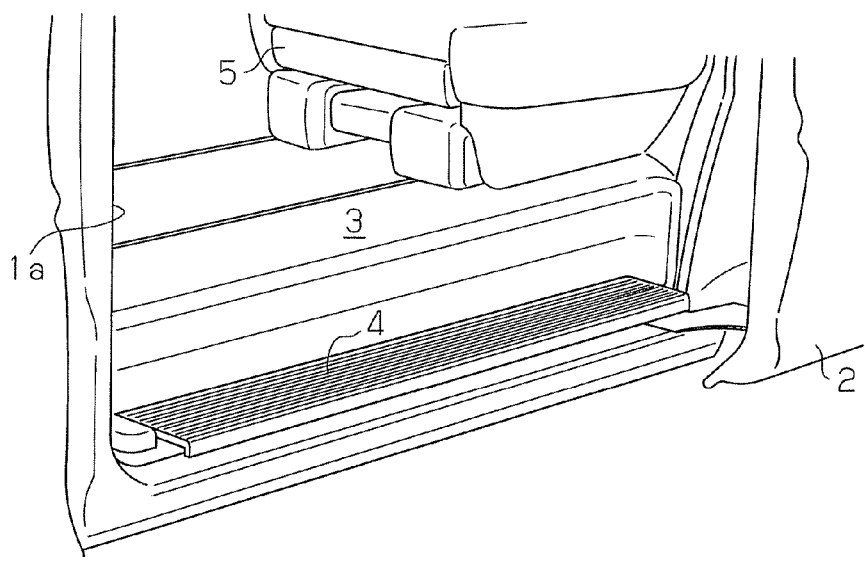

STEP DEVICE FOR VEHICLE

FIELD OF THE INVENTION

The present invention relates to a vehicle step device.

BACKGROUND OF THE INVENTION

The floor of a vehicle such as a van is normally located at a relatively high position. Thus, a step is arranged at a position that is one step lower than the floor at the doorway of the vehicle. In a structure in which the step is just arranged at the doorway, however, the step reduces the effective floor area of the vehicle. That is, the step forms a hollow space near the feet of a passenger who is sitting on a seat arranged on the vehicle floor. Thus, the passenger is forced to take an unnatural seating position. Further, luggage held in the passenger compartment may fall into the hollow space.

In view of the above situations, patent document 1 describes an example of a vehicle step device having an enlarged floor so that the hollow space, that is, the step area is sufficiently small. The step is configured so that it can be projected and retracted to compensate for the reduced step area. Specifically, a motor, which is arranged near the lower part of a vehicle door, produces forward rotation or rearward rotation in accordance with whether a vehicle door is open or closed to project or retract the step.

The device described in patent document 1 is expensive since it requires a motor used exclusively for projecting and retracting the step, a switch for detecting whether the step has been projected to a predetermined position, and a control circuit for controlling the motor based on a signal from the detection switch. Furthermore, in this device, to avoid interference between the vehicle door and the step or prevent excessive load from being applied to an object caught in the step, complicated control must be executed with the motor. This results in an inevitable increase in costs.

[Patent Document 1] Japanese Examined Utility Model Publication No. 4-3870

SUMMARY OF THE INVENTION

It is an object of the present invention to provide a vehicle step device that can project and retract a step based on an opening or closing operation of a vehicle door with a simple structure.

To achieve the above object, one aspect of the present invention provides a step device for a vehicle including a movable step arranged in a doorway opened and closed by a door. The step device includes an electrical drive source, a first transmission mechanism, a second transmission mechanism, and a plate cam. The first transmission mechanism transmits power from the electrical drive source to the door and opens or closes the door. The second transmission mechanism transmits power from the electrical drive source to the step through the first transmission mechanism and moves the step. The plate cam is rotated by the first transmission mechanism and engaged with a follower arranged in the second transmission mechanism to enable or disable power transmission between the first and the second transmission mechanisms. The plate cam includes a first cam portion and a second cam portion. The first cam portion pushes the follower during rotation of the plate cam when the door is in a range of a predetermined open/close position to enable or disable power transmission between the first and the second transmission mechanisms. The second cam portion frees the follower from the pushing during rotation of the plate cam and disables power transmission between the first and the second transmission mechanisms when the door is outside the range of the predetermined open/close position.

BRIEF DESCRIPTION OF THE DRAWINGS

FIGS. 21(a), 21(b), 21(c), and 21(d) are schematic diagrams showing the operation of the step device of FIG. 1.

DETAILED DESCRIPTION OF THE PREFERRED EMBODIMENTS

A vehicle step device according to one embodiment of the present invention will now be discussed with reference to the drawings.

Figure 22:
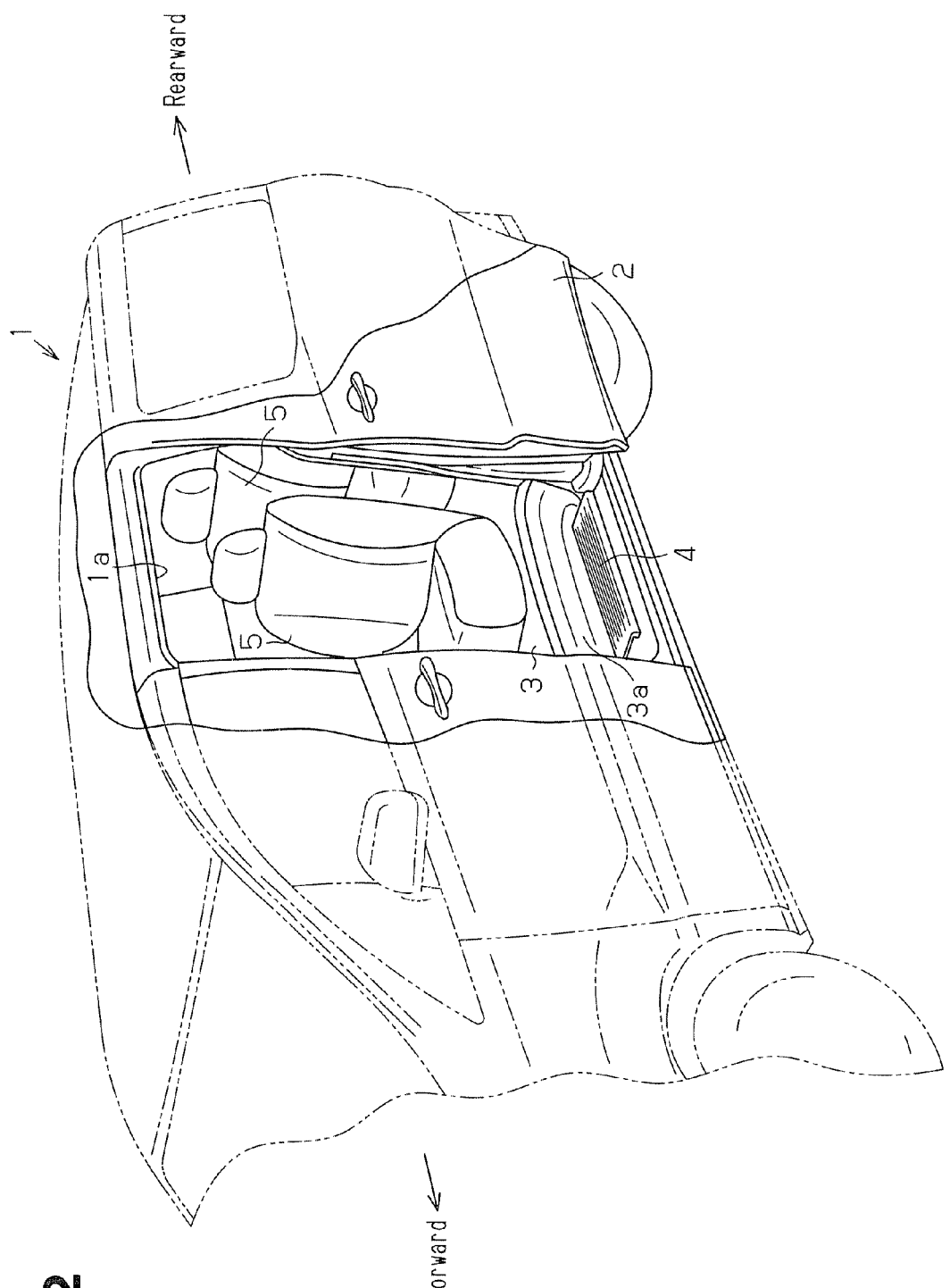
FIG. 22 is a schematic diagram showing a vehicle provided with the step device of FIG. 1.

FIG. 22 is a schematic diagram showing a vehicle such as an automobile to which the present invention is applied. A door opening 1a is formed in the side of a vehicle body 1. A slide door 2, which serves as a vehicle door that moves toward the front and rear of the vehicle, opens and closes the door opening 1a. The portion of a vehicle floor 3 that corresponds to the door opening 1a is hollowed toward the inner side of the vehicle to form a doorway 3a. A movable step 4 is arranged in the doorway 3a. The movable step 4 is arranged at a position that is one step lower than the vehicle floor 3, and is projected and retracted (moved) in a lateral direction of the vehicle. A plurality of seats 5 are arranged on the vehicle floor 3, with one of the seats 5 being located near the movable step 4 (doorway 3a).

Figure 1:
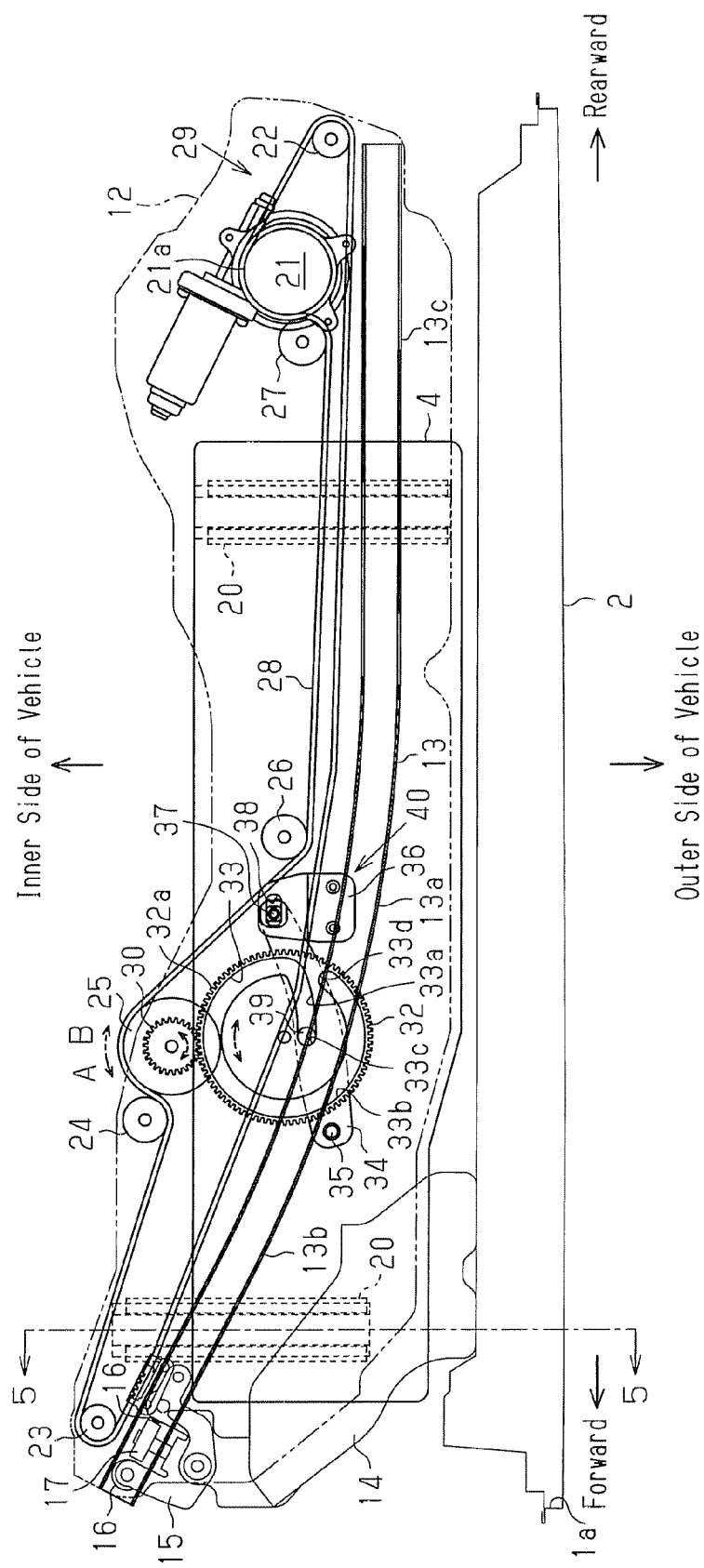
FIG. 1 is a plan view showing a vehicle step device according to one embodiment of the present invention in a state in which a slide door is fully closed.
Figure 2:
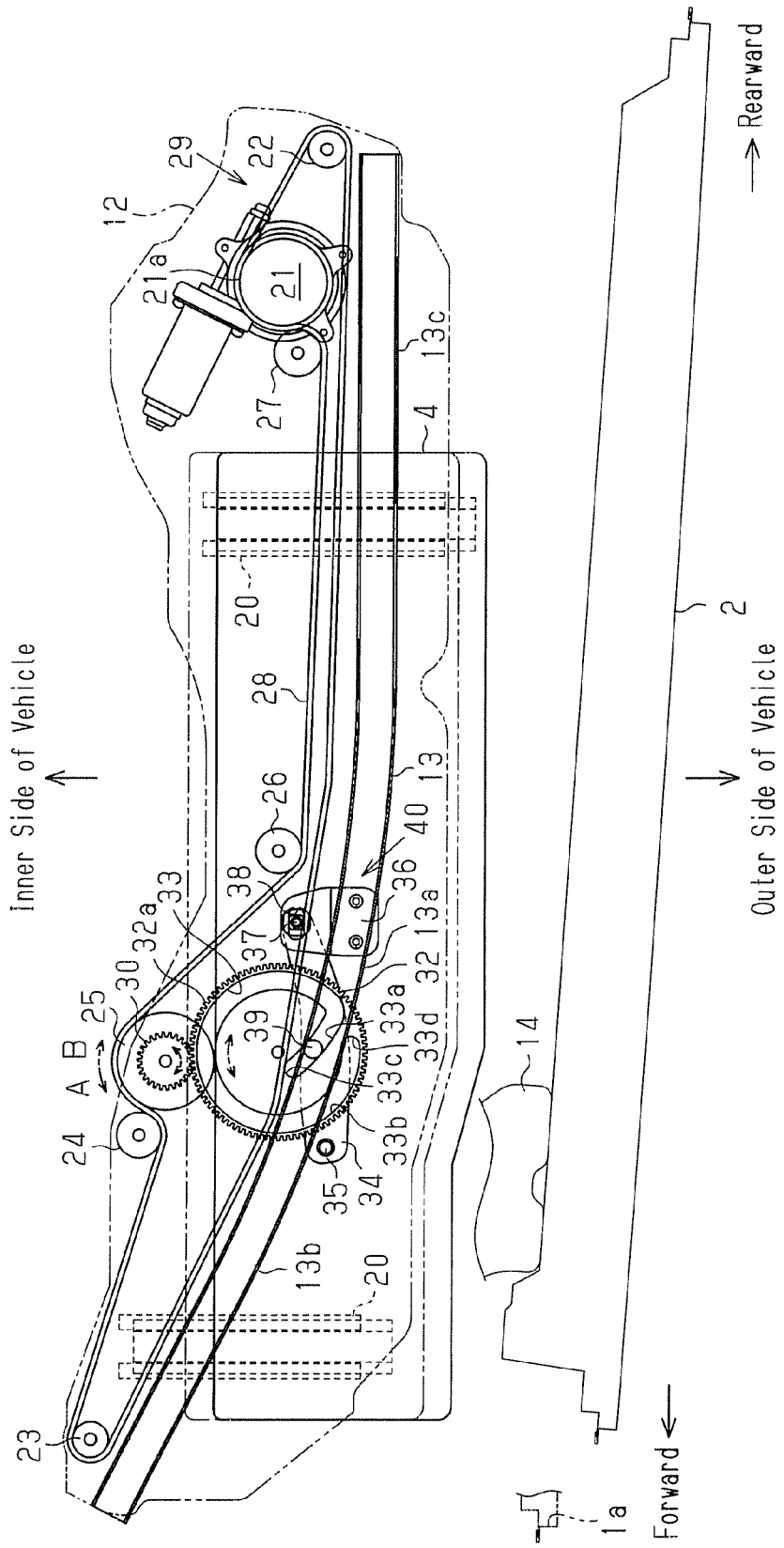
FIG. 2 is a plan view showing the step device of FIG. 1 in a state in which a movable step is being operated.
Figure 3:
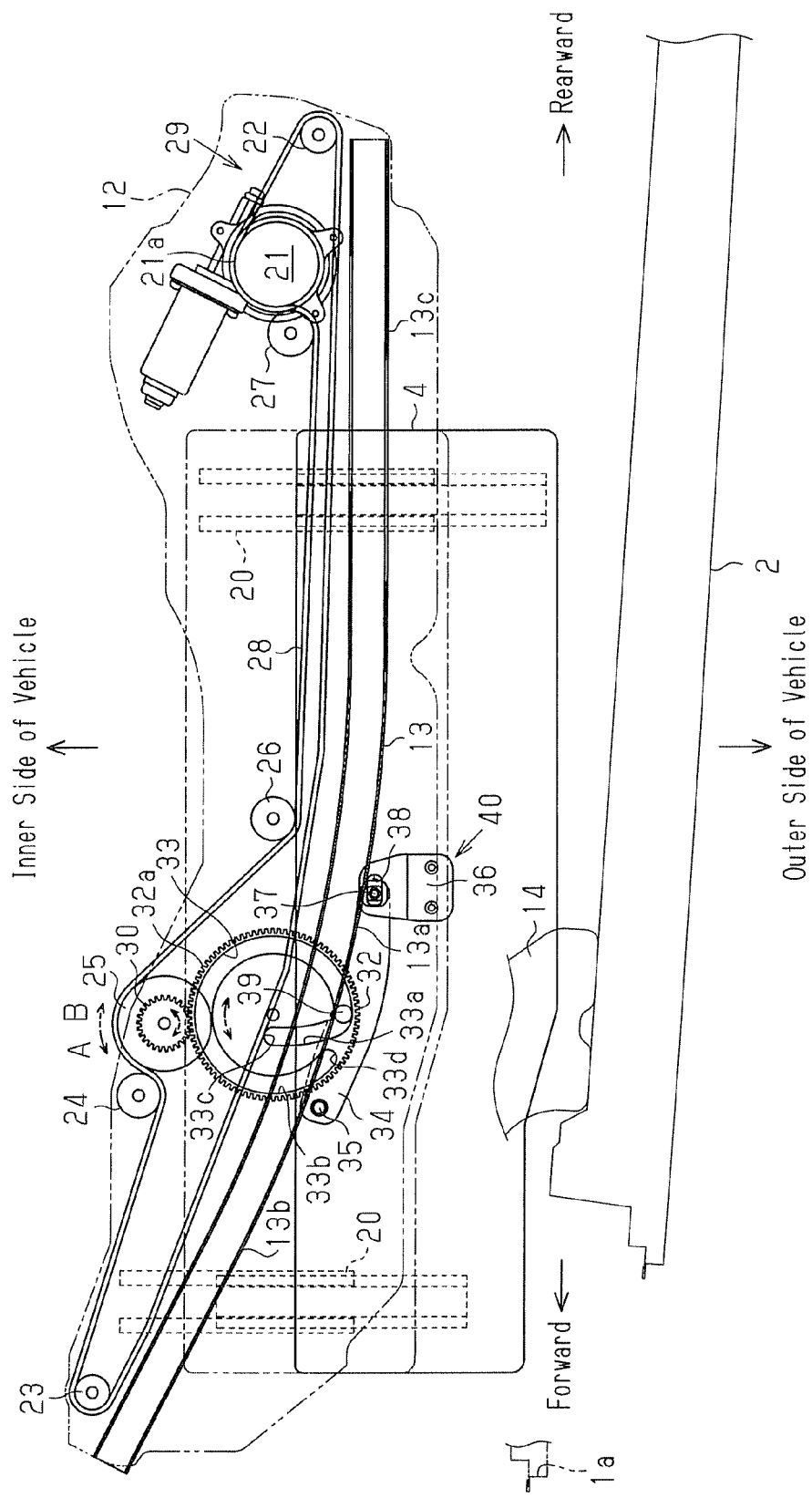
FIG. 3 is a plan view showing the step device of FIG. 1 in a state in which projection of the movable step is completed.
Figure 4:
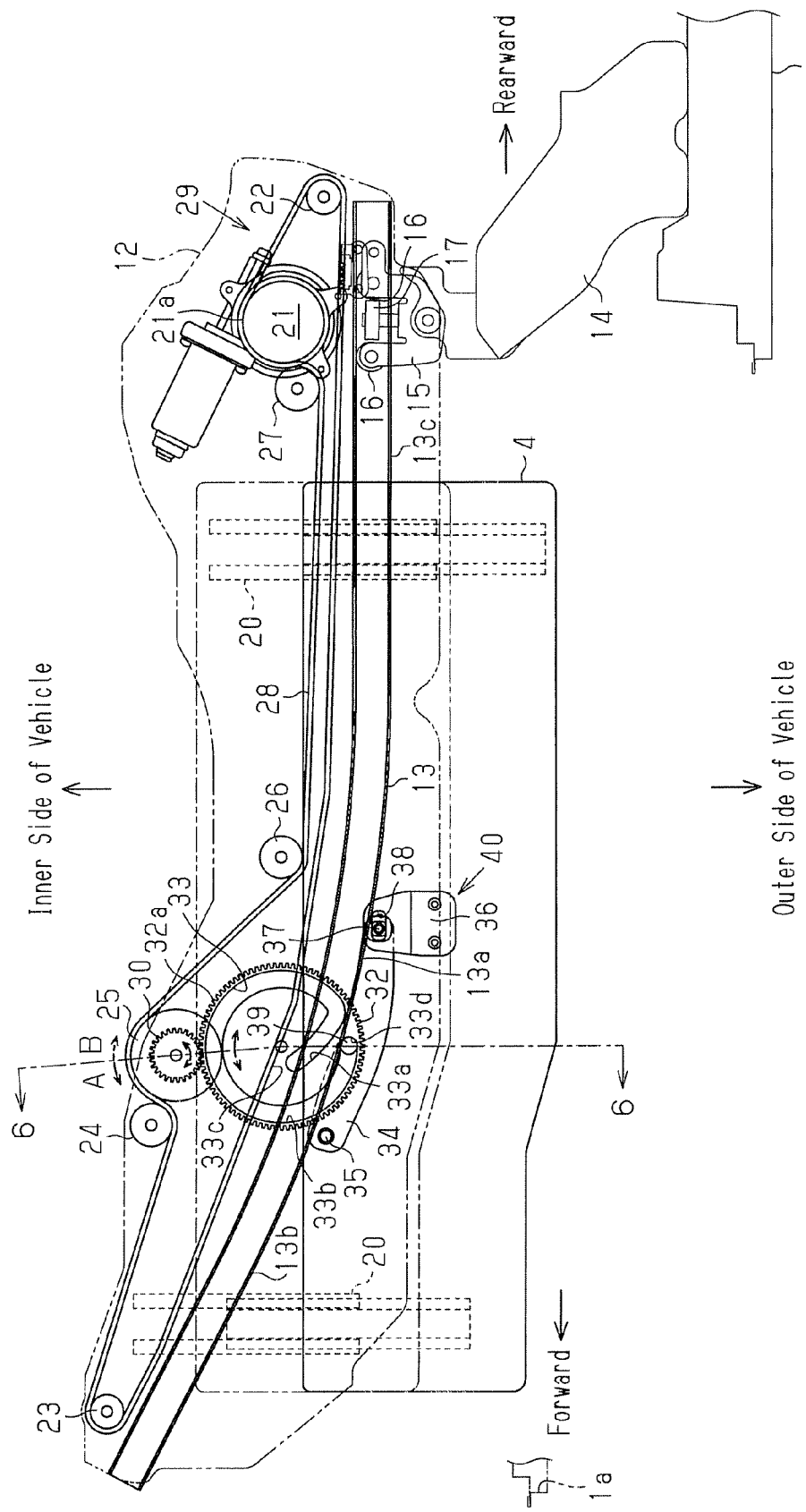
FIG. 4 is a plan view showing the step device of FIG. 1 in a state in which the slide door is fully open.
Figure 5:
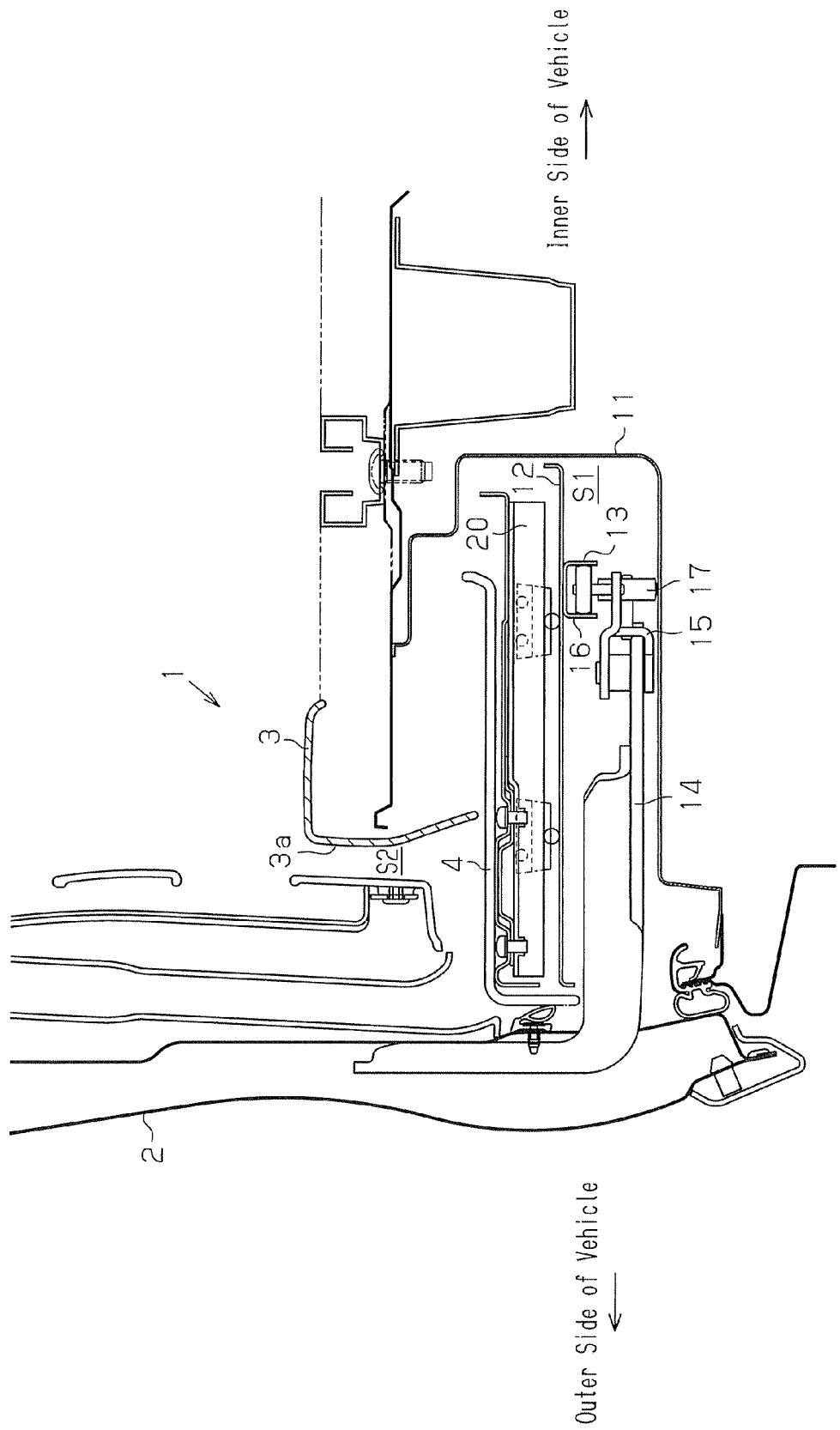
FIG. 5 is a cross-sectional view taken along line 5-5 in FIG. 1.

The structure for opening and closing the slide door 2 and projecting and retracting the movable step 4 will now be described in detail with reference to FIGS. 1 to 6. FIGS. 1 and 4 are plan views respectively showing the step device when the slide door 2 is in a fully closed state and a fully open state. FIGS. 2 and 3 are plan views respectively showing the movable step 4 in a state in which it is being operated and in a state immediately after its projection is completed. In FIGS. 1 to 4, part of the movable step 4 is illustrated in a transparent state to facilitate the description. FIG. 5 is a cross-sectional view taken along line 5-5 in FIG. 1, and FIG. 6 is a cross-sectional view taken along line 6-6 in FIG. 4.

Figure 6:
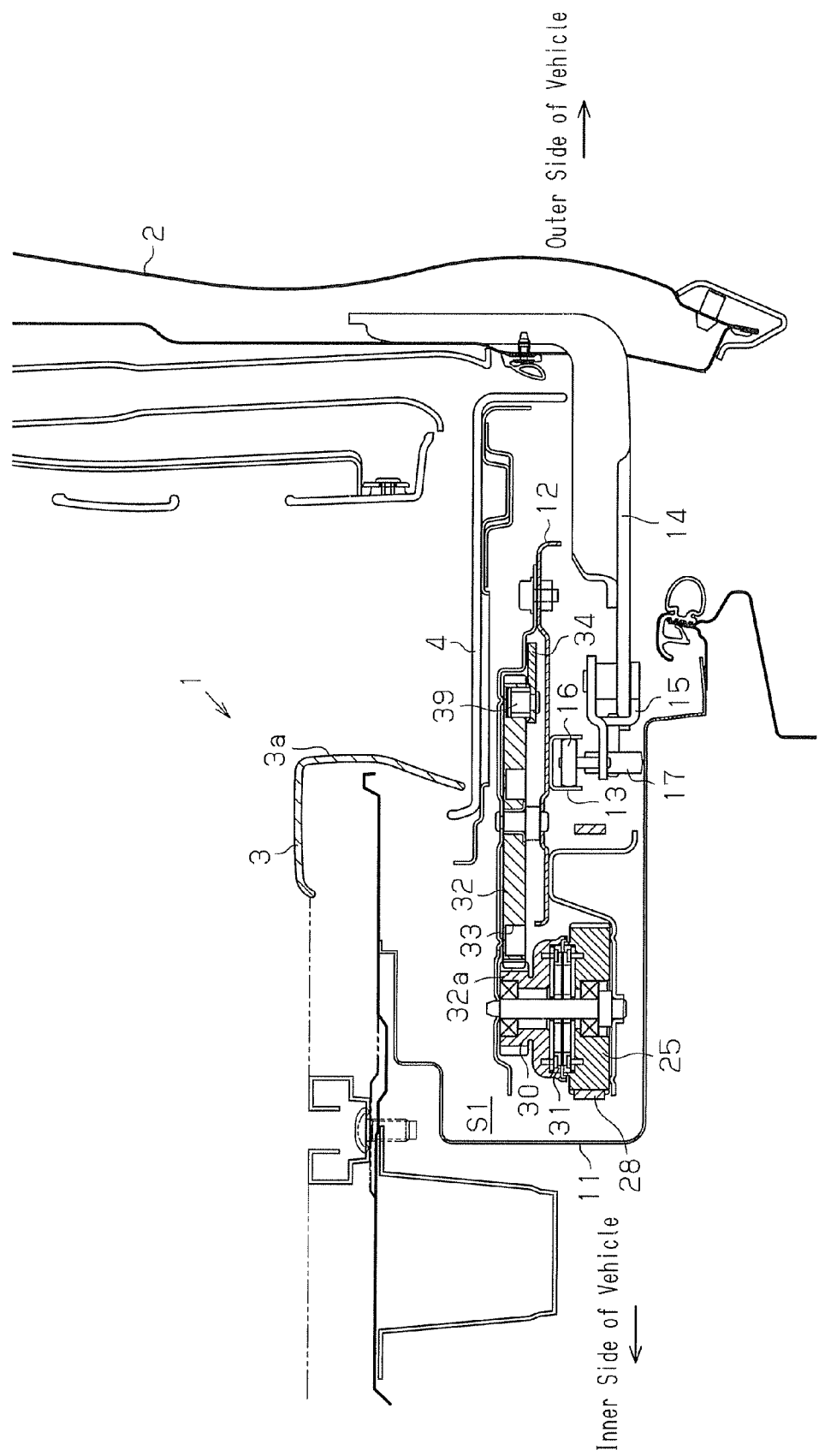
FIG. 6 is a cross sectional view taken along line 6-6 in FIG. 4.

As shown in FIGS. 5 and 6, a box-shaped case 11, which is located below the vehicle floor 3 and which is open toward the outer side of the vehicle, is fixed to the vehicle body 1. The case 11 includes an accommodation space S1. A support panel 12, which is located at the middle of the case 11 in a heightwise direction and extended in the lateral direction of the vehicle within a range in which it does not interfere with the slide door 2, is fixed to the vehicle body 1. Rail members 20 (see FIG. 5) support the movable step 4 on the support panel 12 so that the movable step 4 is slidable in the lateral direction of the vehicle. As shown in FIG. 1, the rail members 20 are arranged at both of the front and rear ends of the movable step 4. The longitudinal direction (guiding direction) of the rail members 20 coincides with the lateral direction of the vehicle.

A guide rail 13 is fixed to the lower surface of the support panel 12. The guide rail 13 guides the slide door 2 when it opens and closes. Specifically, the guide rail 13 includes a longitudinally middle part that defines a curved portion 13a, as shown in FIG. 1. The guide rail 13 includes an inclined portion 13b, which is inclined toward the inner side of the vehicle in front of the curved portion 13a. The guide rail 13 includes a linear portion 13c, which extends in the longitudinal direction of the vehicle at the rear of the curved portion 13a.

An arm 14, which is arranged at the lower part of the slide door 2, projects toward the inner side of the vehicle from the slide door 2. The arm 14 has a distal end to which a roller support member 15 is pivotally connected. The roller support member 15 includes two guide rollers 16 and a load roller 17, which is arranged between the guide rollers 16. The guide rollers 16 each have a rotational axis extending in the heightwise direction of the vehicle (direction orthogonal to the plane of drawing in FIG. 1), and the load roller 17 has a rotational axis extending in a direction orthogonal to a plane including the rotational axes of the guide rollers 16. The guide rollers 16 supported by the guide rail 13 in a manner that they can be rolled. The load roller 17 supports the roller support member 15 in the accommodation space S1 in a manner in which the roller support member 15 can be rolled on the case 11 (vehicle body 1).

Accordingly, the guide rail 13 guides the guide rollers 16 when the slide door 2 slides in the longitudinal direction of the vehicle to open or close the door opening 1a. The load roller 17 supports the load of the slide door 2. When the guide rollers 16 are guided by the inclined portion 13b of the guide rail 13, the slide door 2 is either pushed toward the outer side of the vehicle immediately after it starts to move from a fully closed state or pulled toward the inner side of the vehicle immediately before it becomes fully closed. Such guide allows the slide door 2 to slide rearward when it opens and allows the outer surface of the slide door 2 to be flush with the side surface of the vehicle body 1 in a fully closed state.

A mechanism for opening and closing the slide door 2 is arranged on the support panel 12 at a location that is inward from the guide rail 13. Specifically, the support panel 12 supports a slide door drive unit 21, which serves as an electrical drive source, a plurality of idle gears 22, 23, 24, 25, 26, and 27, which are sequentially arranged in the clockwise direction from the drive unit 21, and a drive belt 28, which is connected to an output gear 21a of the drive unit 21 and the idle gears 22 to 27. The idle gears 22 to 27 and the drive belt 28 form an open/close mechanism 29, which serves as a first transmission mechanism.

The drive unit 21 is fixed to the support panel 12 and rotates the output gear 21a. The idle gears 22 to 27 are rotatably supported by the support panel 12. The idle gears 23 and 22 are respectively arranged near the front and rear ends of the guide rail 13. The idle gear 25 is arranged between the idle gears 22 and 23 at locations inward from the guide rail 13. Furthermore, a suitable idle gear (not shown) to which the drive belt 28 is connected is arranged near the curved portion 13a between the idle gears 22 and 23.

The roller support member 15 has a distal portion fixed to a portion of the drive belt 28 facing toward the guide rail 13. When the slide door 2 is in the fully closed state as shown in FIG. 1, the distal portion of the roller support member 15 is arranged near the idle gear 23, that is, near the front end of the guide rail 13. Further, when the slide door 2 is in the fully open state as shown in FIG. 4, the distal portion of the roller support member 15 is arranged near the idle gear 22, that is, near the rear end of the guide rail 13.

In FIGS. 1 to 3, when the drive unit 21 rotates the output gear 21a in the counterclockwise direction, the portion of the drive belt 28 facing toward the guide rail 13 moves toward the rear of the vehicle as the drive belt 28 rotates the idle gears 22 to 27. In this state, the idle gear 25 rotates in the counterclockwise direction as viewed in the drawings. As a result, the slide door 2 moves toward the rear of the vehicle along the guide rail 13 and thereby opens the door opening 1a.

In FIGS. 2 to 4, when the drive unit 21 rotates the output gear 21a in the clockwise direction, the portion of the drive belt 28 between the idle gears 22 and 23 moves toward the front of the vehicle along the guide rail 13 as the drive belt 28 rotates the idle gears 22 to 27. In this state, the idle gear 25 rotates in the clockwise direction as viewed in the drawings. As a result, the slide door 2 moves toward the front of the vehicle along the guide rail 13 and thereby closes the door opening 1a.

As shown in FIG. 6, a gear 30, which is coaxial with and arranged on the idle gear 25, is rotatably supported by the support panel 12. A torque limiter 31, which limits the torque that can be transmitted between the idle gear 25 and the gear 30 to a fixed value, is arranged between the idle gear 25 and the gear 30. A disk-shaped plate cam 32 is rotatably supported by the support panel 12. The plate cam 32 has a peripheral portion defining a gear portion 32a, which is mated with the gear 30.

Accordingly, when the torque transmitted from the idle gear 25 to the gear 30 is less than the fixed value, the idle gear 25 integrally rotates the gear 30 by means of the torque limiter 31 and thereby rotates the plate cam 32. When the transmitted torque exceeds the fixed value, the torque limiter 31 mechanically slips and idly rotates. As a result, the plate cam 32 does not rotate and remains still with the gear 30. In this manner, the torque limiter 31 limits the torque transmitted from the idle gear 25 (open/close mechanism 29) to the plate cam 32 to the fixed value.

As shown in FIG. 1, a groove cam 33 is formed in the plate cam 32. The groove cam 33 includes a first recess 33a and a second recess 33b. The first recess 33a serves as a first cam portion and extends such that the radial distance from the rotational axis of the plate cam 32 varies along the circumferential direction. The second recess 33b serves as a second cam portion and extends in an arcuate manner such that the radial distance from the rotational axis of the plate cam 32 is constant along the circumferential direction. Further, the second recess 33b is connected to the first recess 33a.

An elongated lever 34 has a basal portion coupled by a pin 35 to the support panel 12. The lever 34 is pivotal about the pin 35. The lever 34 has a distal portion coupled to a bracket 36, which is fixed to the movable step 4. The lever 34 and the pin 35 form a projection/retraction mechanism 40 serving as a second transmission mechanism. When the lever 34 pivots about the pin 35, the movable step 4 is projected or retracted by an amount corresponding to the amount the distal portion of the lever 34 moves in the lateral direction of the vehicle. In this state, the distal portion of the lever 34 is coupled to the bracket 36 so as to absorb the movement of the lever 34 in the longitudinal direction of the vehicle. Specifically, a lock pin 37 projects from the distal portion of the lever 34, and an elongated hole 38 into which the lock pin 37 is inserted and retained is formed in the bracket 36. The longitudinal direction of the elongated hole 38 coincides with the longitudinal direction of the vehicle. This allows the lever 34 to pivot in the longitudinal direction of the vehicle as the lock pin 37 moves along the elongated hole 38.

A bushing 39, which serves as a follower accommodated in the groove cam 33, is fixed to the longitudinally middle part of the lever 34. The bushing 39 is arranged at a terminal end 33c of the first recess 33a when the slide door 2 is at a fully closed position (see FIG. 1) and arranged at a terminal end 33d of the second recess 33b when the slide door 2 is at a fully open position (see FIG. 4). Specifically, a reduction ratio between the gear 30 and the gear portion 32a of the plate cam 32 is set such that the bushing 39 completely moves from the terminal end 33c of the first recess 33a to the terminal end 33d of the second recess 33b so that the slide door 2 completely moves from the fully closed position to the fully open position.

Furthermore, the bushing 39 is arranged at a connecting part of the first and the second recesses 33a and 33b when the slide door 2 reaches a predetermined open/close position (door opening position) (see FIG. 3). The predetermined open/close position is the position of the slide door 2 used as a reference to determine whether or not a passenger can get into or out of the vehicle. When the bushing 39 is located in the first recess 33a (see FIGS. 1 to 3), vertical walls of the groove cam 33 (first recess 33a) push the bushing 39, and the lever 34 pivots about the pin 35 as the plate cam 32 rotates. When the bushing 39 is located in the second recess 33b (see FIGS. 3 and 4), the vertical walls of the groove cam 33 (second recess 33b) restrict the movement of the bushing 39 (movement in the radial direction about the rotational axis of the plate cam 32). This restricts the movement of the lever 34 about the pin 35 when the plate cam 32 rotates. In this manner, the movable step 4 projects or retracts in accordance with the rotation direction of the plate cam 32 when the bushing 39 is located in the first recess 33a. Further, the movable step 4 remains at position at which the projection is completed irrespective of the rotation of the plate cam 32 when the bushing 39 is located in the second recess 33b.

Normal operation of the vehicle step device in the present embodiment will now be discussed. During normal operation, it is assumed here that the torque transmitted to the torque limiter 31 arranged between the idle gear 25 and the gear 30 does not exceed the fixed value.

Figure 7:
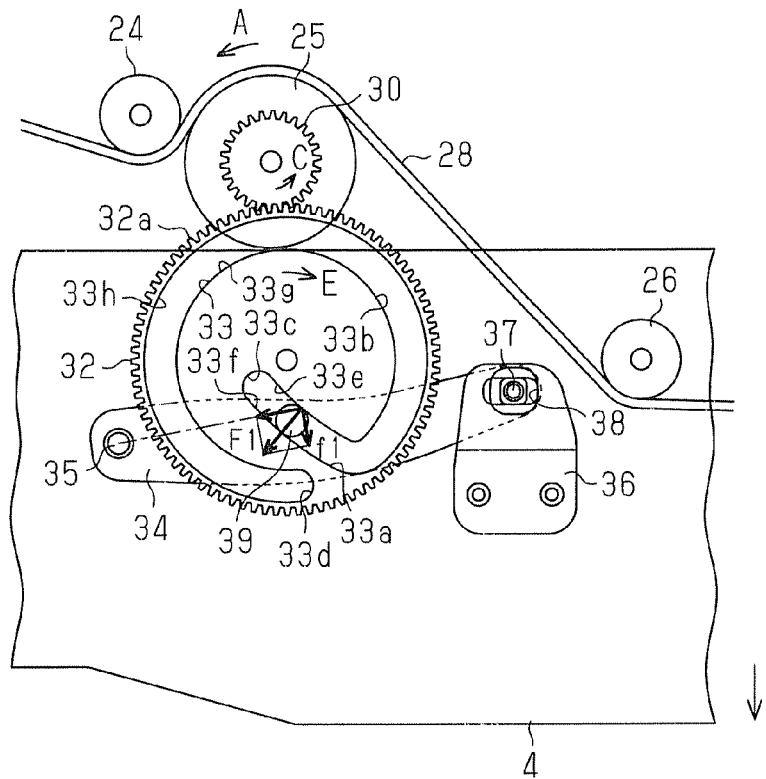
FIG. 7 is an enlarged view of FIG. 2.

When the slide door 2 is located at the fully closed position, to open the slide door 2, the drive belt 28 is moved in the direction of arrow A, which is indicated in FIGS. 1 and 2. In this case, as shown in FIG. 7, the idle gear 25 rotates in the counterclockwise direction (direction of arrow C) integrally with the gear 30. The plate cam 32, which is mated with the gear 30, rotates in the clockwise direction (direction of arrow E) together with its groove cam 33. In this state, one vertical wall 33e of the first recess 33a produces force F1 that pushes the bushing 39, which is accommodated in the first recess 33a. This produces force f1 that pushes the lever 34, which is fixed to the bushing 39, so as to pivot the lever 34 about the pin 35 in the clockwise direction. Then, the bracket 36, which is coupled to the distal portion of the lever 34, projects the movable step 4.

Figure 8:
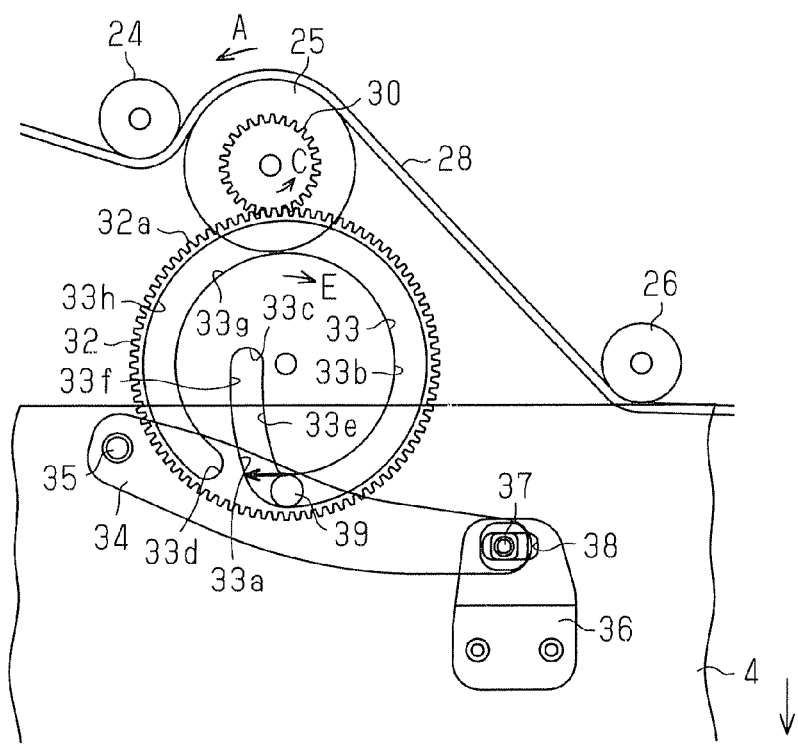
FIG. 8 is an enlarged view of FIG. 3.
Figure 9:
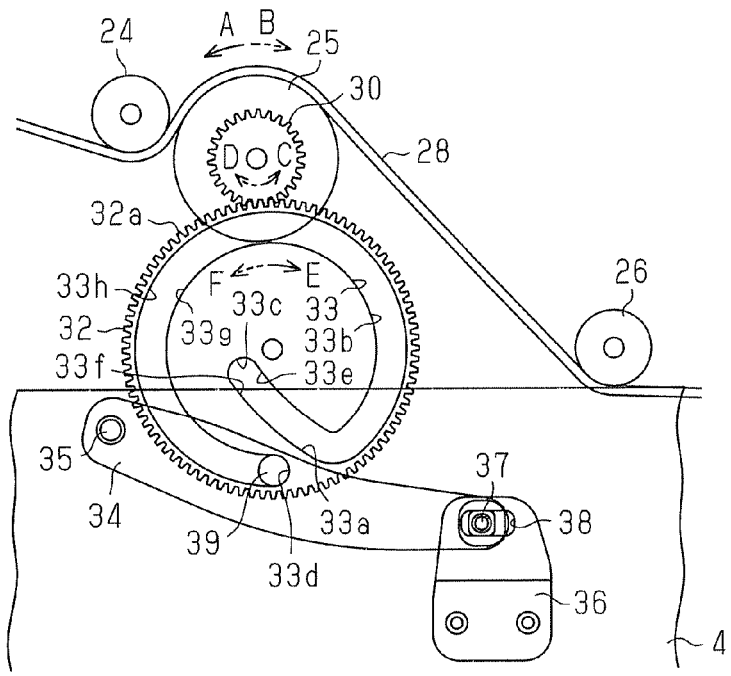
FIG. 9 is an enlarged view of FIG. 4.

When the slide door 2 reaches the predetermined open/close position, the bushing 39 enters the second recess 33b from the first recess 33a and is no longer pushed by the vertical wall 33e, as shown in the state of FIG. 8. That is, the power transmitted from the idle gear 25 and the gear 30 to the lever 34 by the plate cam 32 is cut off, and the projecting operation of the movable step 4 is completed. In other words, the projecting operation of the movable step 4 is determined by the first recess 33a (vertical wall 33e) of the plate cam 32. Specifically, the plate cam 32 basically transmits power between the open/close mechanism 29 (idle gear 25) and the projection/retraction mechanism 40 (lever 34) when the slide door 2 is in a range from the fully closed position to the predetermined open/close position (hereinafter referred to as "range of the predetermined open/close position"). The range of the predetermined open/close position is, in other words, the range of positions of the slide door 2 in which a passenger cannot get into or out of the vehicle. The plate cam 32 cuts off the power transmitted between the open/close mechanism 29 and the projection/retraction mechanism 40 when the slide door 2 goes beyond the range of the predetermined open/close position. The slide door 2 moves to the fully open position in a state in which the projection of the movable step 4 is completed (see FIG. 4). In this state, as shown in FIG. 9, the bushing 39 becomes arranged at the terminal end 33d of the second recess 33b as described above.

Figure 10:
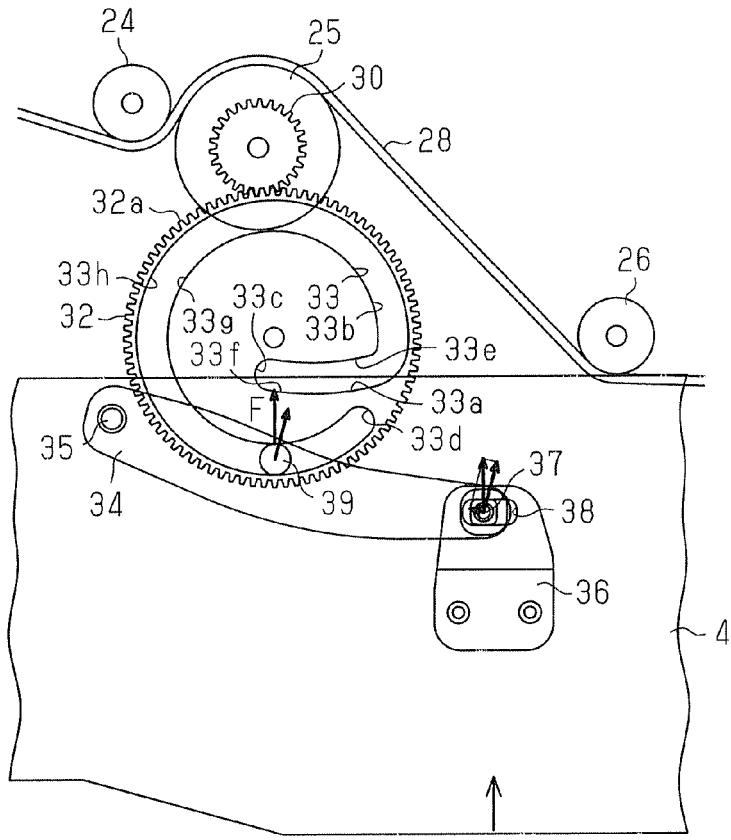
FIG. 10 is an enlarged plan view showing the operation of the step device of FIG. 1.

As shown in FIG. 10, when the bushing 39 is in the second recess 33b, force may be applied to the movable step 4 in the retracting direction of the movable step 4, for example, when the movable step 4 is kicked. In this case, the force F applied from the bushing 39 to the plate cam 32 is directed towards the rotational axis of the plate cam 32. Thus, moment acting as a force that rotates the plate cam 32 cannot be produced, and the movable step 4 remains projected.

To close the slide door 2 from the fully open position, it is assumed here that the drive belt 28 is moved in the direction of arrow B, which is indicated in FIGS. 4 and 3. In this case, as shown in FIG. 9, the idle gear 25 rotates in the clockwise direction (direction of arrow D), as shown in the drawing, integrally with the gear 30. The plate cam 32, which is mated with the gear 30, then rotates in the counterclockwise direction (direction of arrow F), as shown, together with the groove cam 33. In this state, the bushing 39 in the second recess 33b is not pushed by vertical walls 33g and 33h of the second recess 33b. That is, when the slide door 2 starts to close, a force that pushes the bushing 39 is not applied to the bushing 39.

Figure 11:
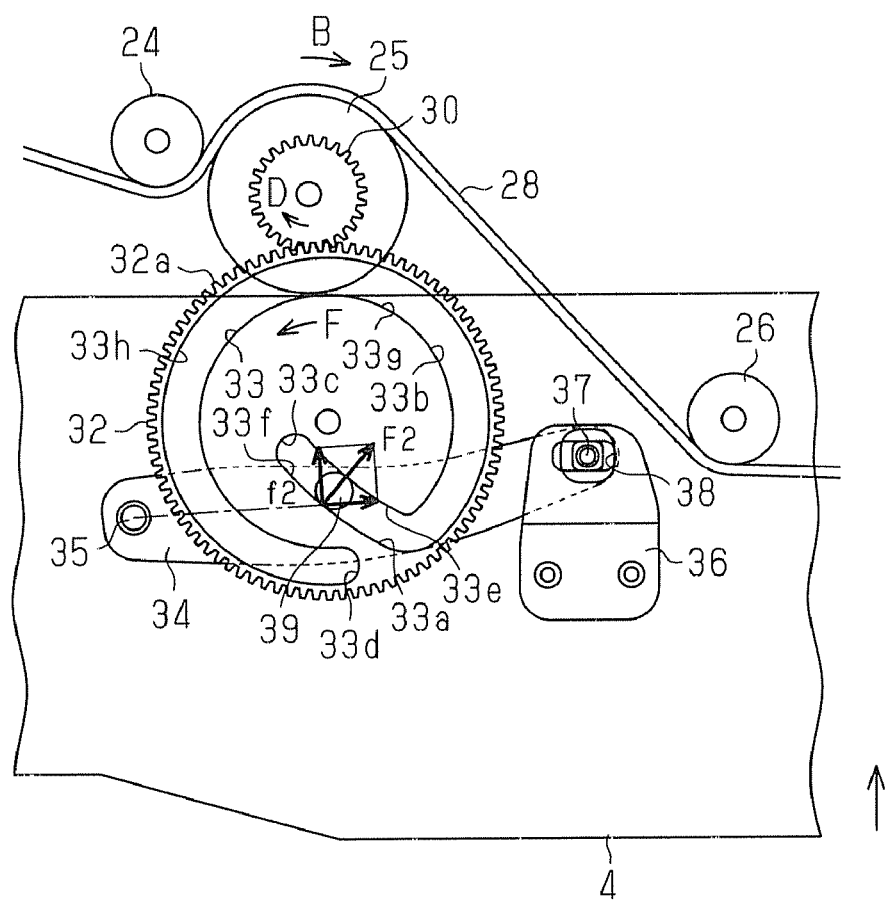
FIG. 11 is an enlarged plan view showing the operation of the step device of FIG. 1.

When the slide door reaches the predetermined open/close position, as shown in FIG. 8, the bushing 39 enters the first recess 33a from the second recess 33b, and a vertical wall 33f starts to push the bushing 39. That is, power is transmitted from the idle gear 25 and the gear 30 to the lever 34 by the plate cam 32 to start the retracting operation of the movable step 4. Referring to FIG. 11, the vertical wall 33f of the first recess 33a produces force F2 that pushes the bushing 39, which is accommodated in the first recess 33a. This produces force f2 that pushes the lever 34, which is fixed to the bushing 39, so as to pivot the lever 34 about the pin 35 in the counterclockwise direction. Then, the bracket 36, which is coupled to the distal portion of the lever 34, retracts the movable step 4.

FIG. 21 is a schematic diagram showing normal operation of the slide door 2 and the corresponding movable step 4. First, the slide door 2 is in the fully closed state (see FIG. 21(a)). When the slide door 2 starts to open (see FIG. 21(b)), the movable step 4 starts to project in cooperation with the slide door 2 since the plate cam 32 is allowed to transmit power. As shown in FIG. 21(c), when the slide door 2 reaches the predetermined open/close position, that is, when the opening of the slide door 2 reaches a predetermined door open degree W, the power transmitted by the plate cam 32 is cut off, and the projection of the movable step 4 is completed. When the slide door 2 further opens beyond the predetermined open/close position, the slide door 2 becomes fully open with the movable step 4 remaining at the projected position (see FIG. 21(d)). When the slide door 2 is closed from the fully open state, the slide door 2 and the movable step 4 are operated by substantially reversing the order of the procedures described above.

A self-reset function that works when an obstacle (foot, curb, etc.) constrains the projecting operation of the movable step 4 will now be discussed with reference to FIGS. 12 to 17.

Figure 12:
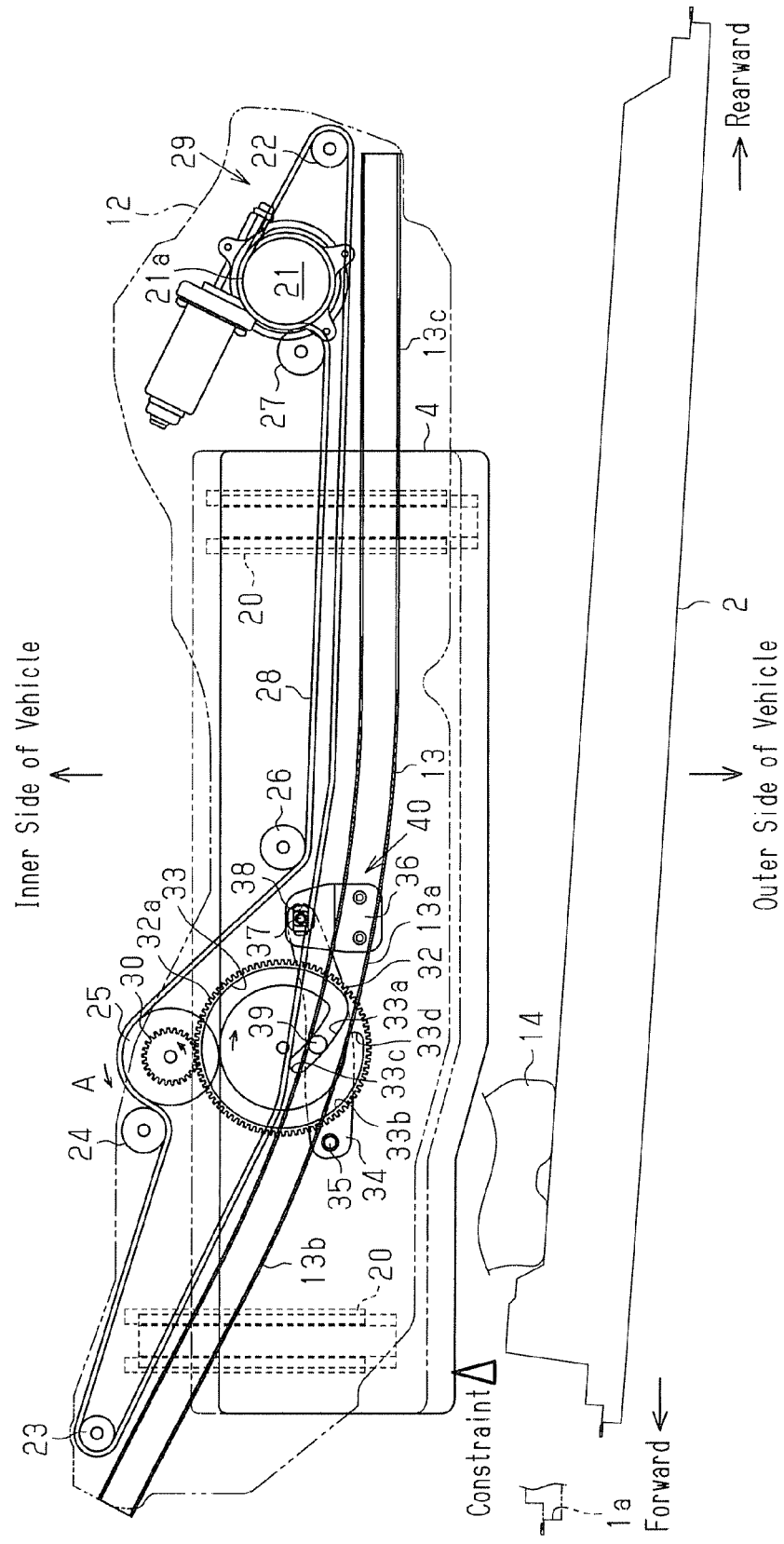
FIG. 12 is a plan view showing a self-reset operation in the step device of FIG. 1.

Referring to FIG. 12, during the projecting operation, when interference with an obstacle produces a load of a certain level or greater and constrains the movable step 4, the torque transmitted to the torque limiter 31, which is arranged between the idle gear 25 and the gear 30, exceeds the fixed value. In this case, the torque limiter 31 idly rotates so as not to affect the opening of the slide door 2.

Figure 13:
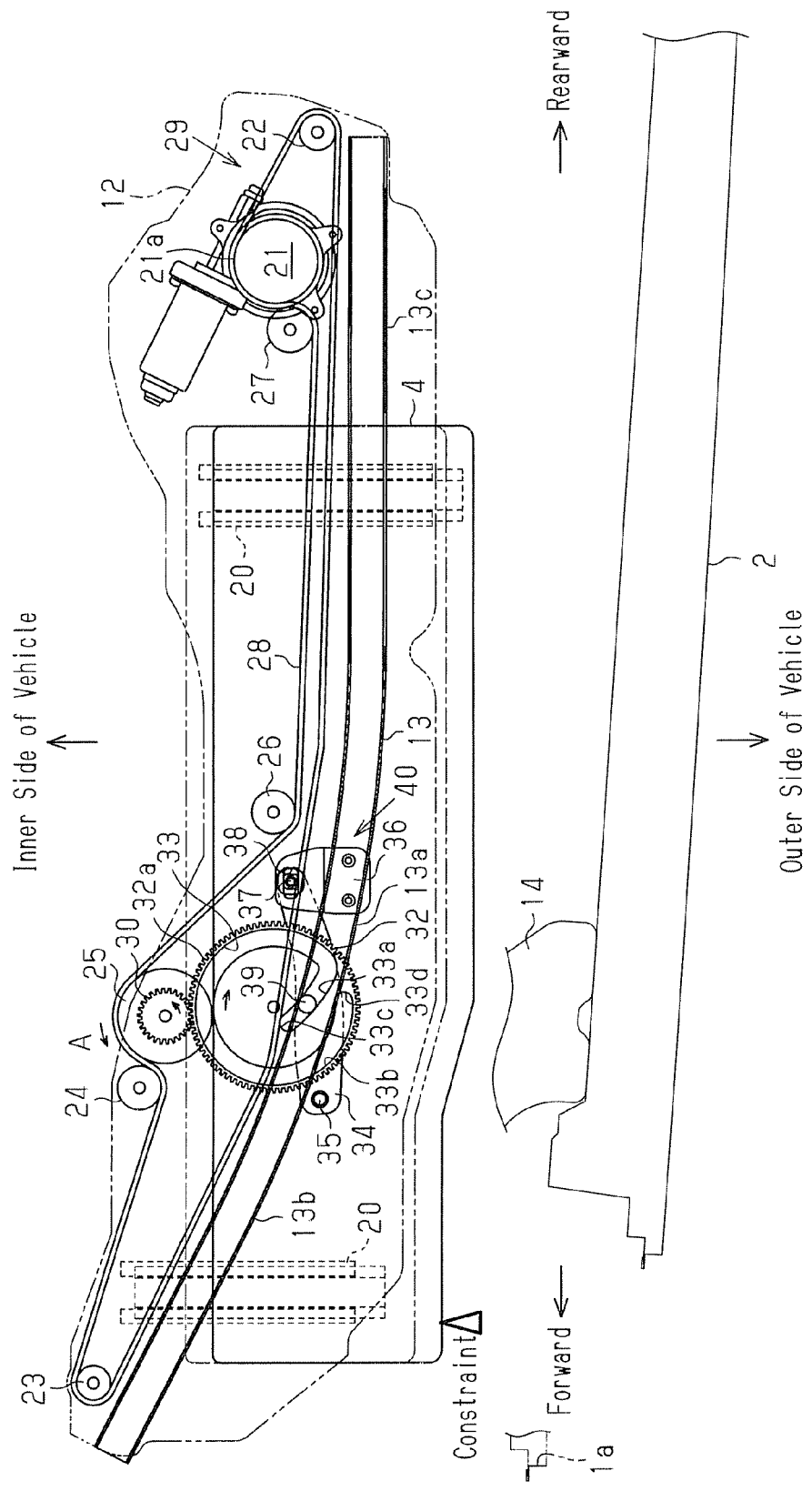
FIG. 13 is a plan view showing the self-reset operation in the step device of FIG. 1.
Figure 14:
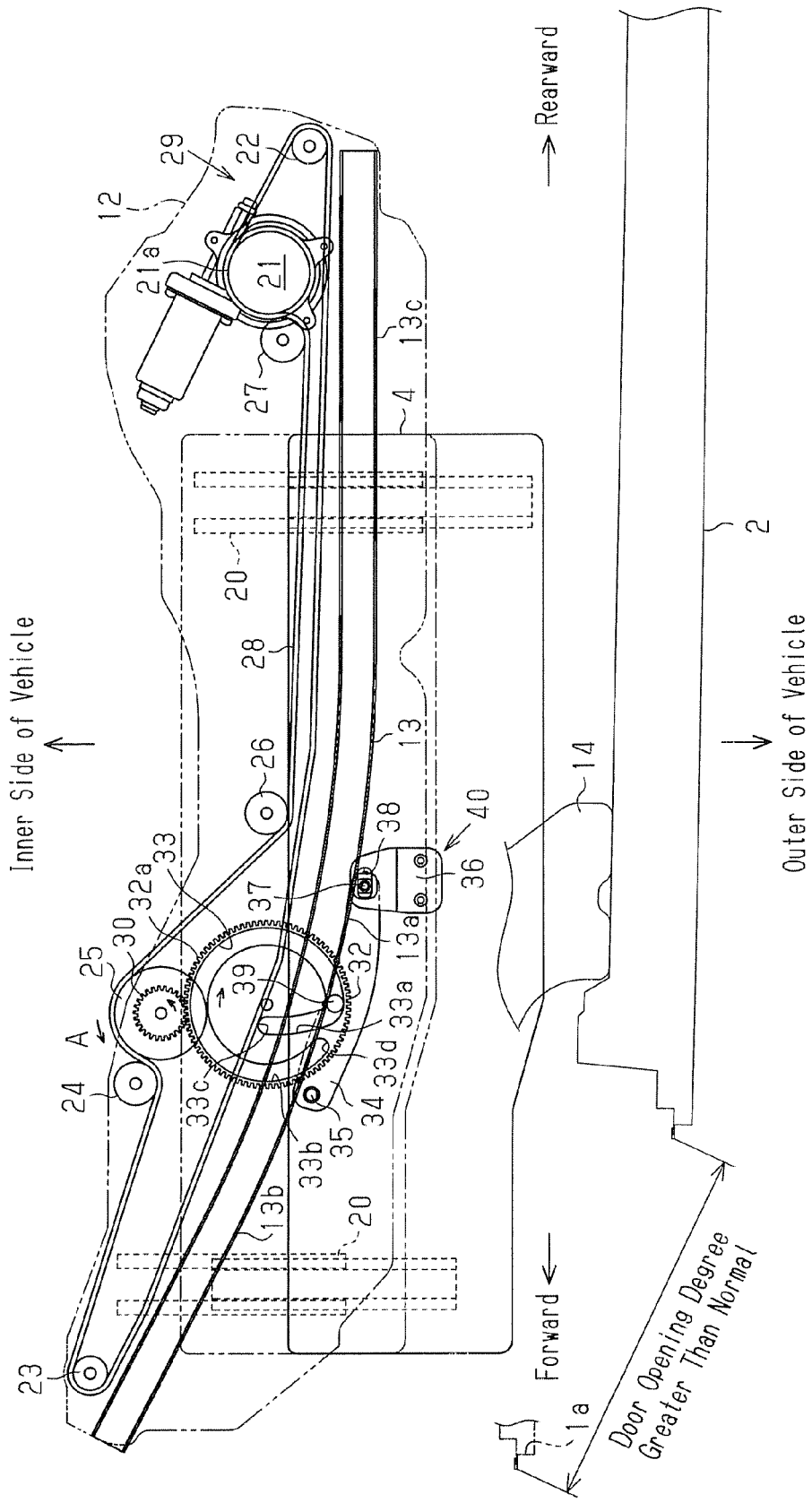
FIG. 14 is a plan view showing the self-reset operation in the step device of FIG. 1.
Figure 15:
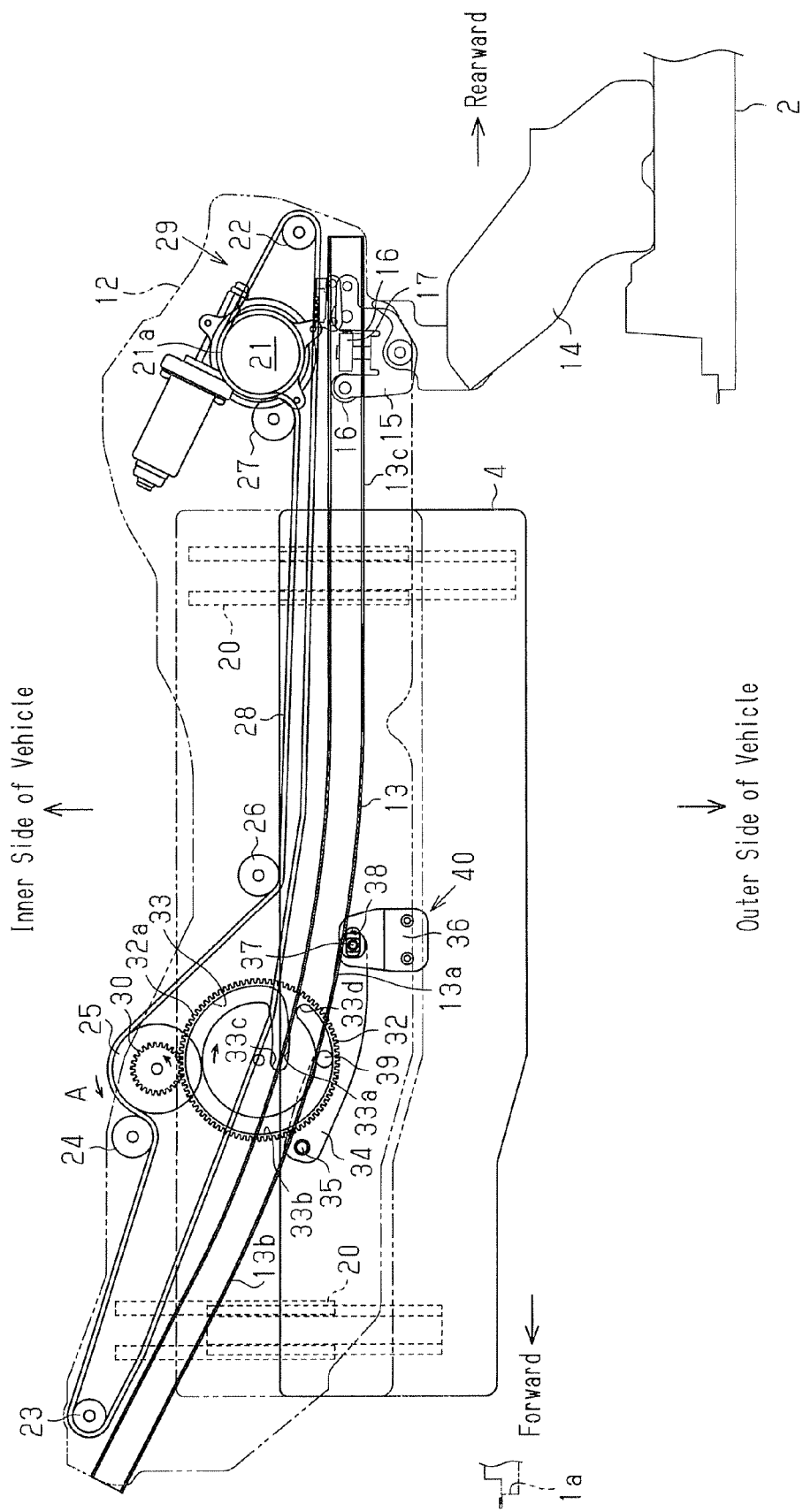
FIG. 15 is a plan view showing the self-reset operation in the step device of FIG. 1.

Subsequently, when the obstacle is removed and the movable step 4 becomes free, the movable step 4 starts the projecting operation again, as shown in FIG. 13. However, the relationship between the rotational position of the plate cam 32 (groove cam 33) and the open/close position of the slide door 2 differs from the relationship of when the normal operation is performed. Thus, the projecting operation of the movable step 4 is completed at the open/close position at where the door open degree of the slide door 2 is larger than that when a normal operation is performed (see FIG. 14). Thus, the bushing 39 in the groove cam 33 does not reach the terminal end 33d of the groove cam 33 (second recess 33b) even if the slide door 2 reaches the fully open position (see FIG. 15).

Figure 16:
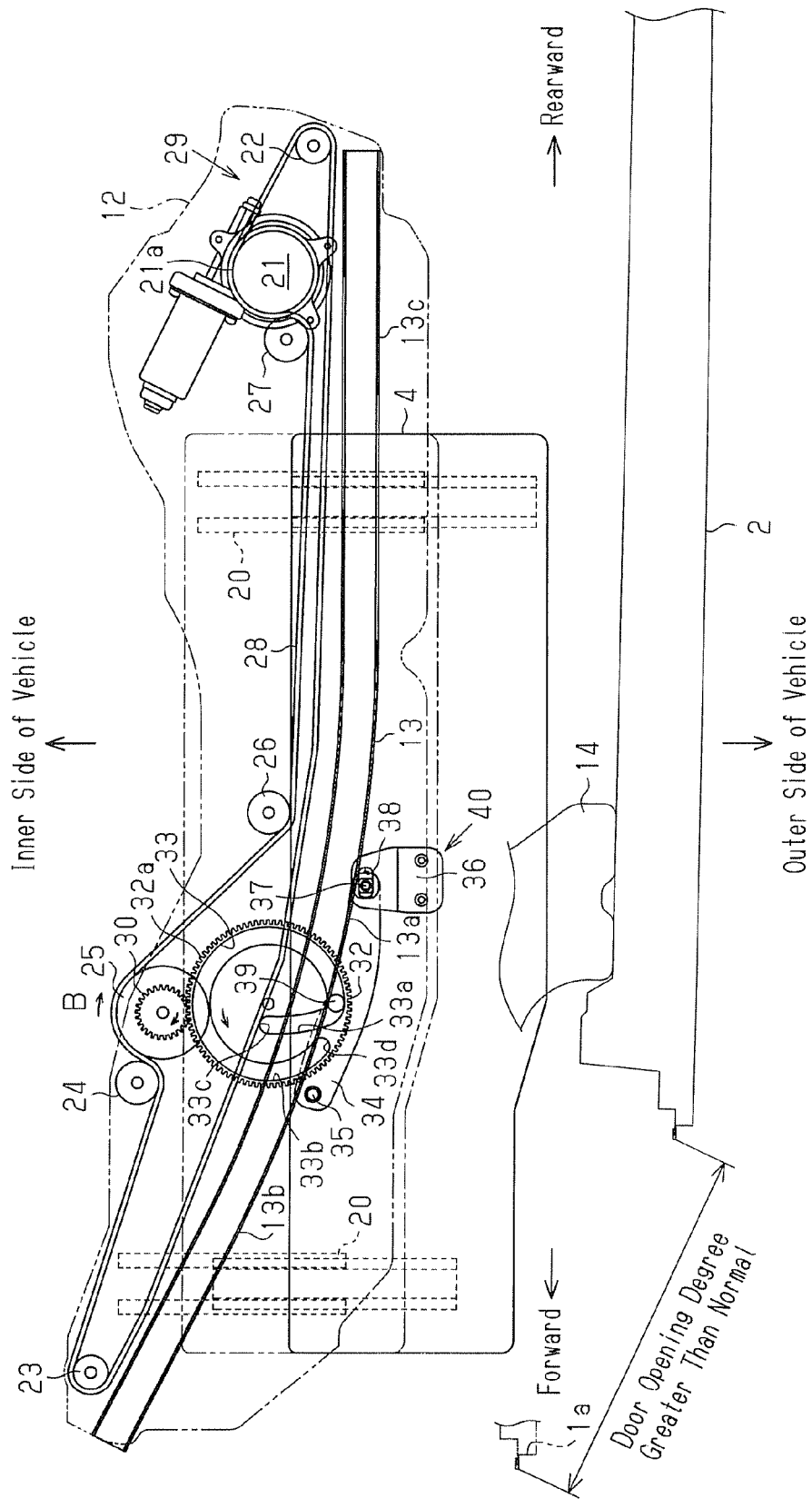
FIG. 16 is a plan view showing the self-reset operation in the step device of FIG. 1.
Figure 17:
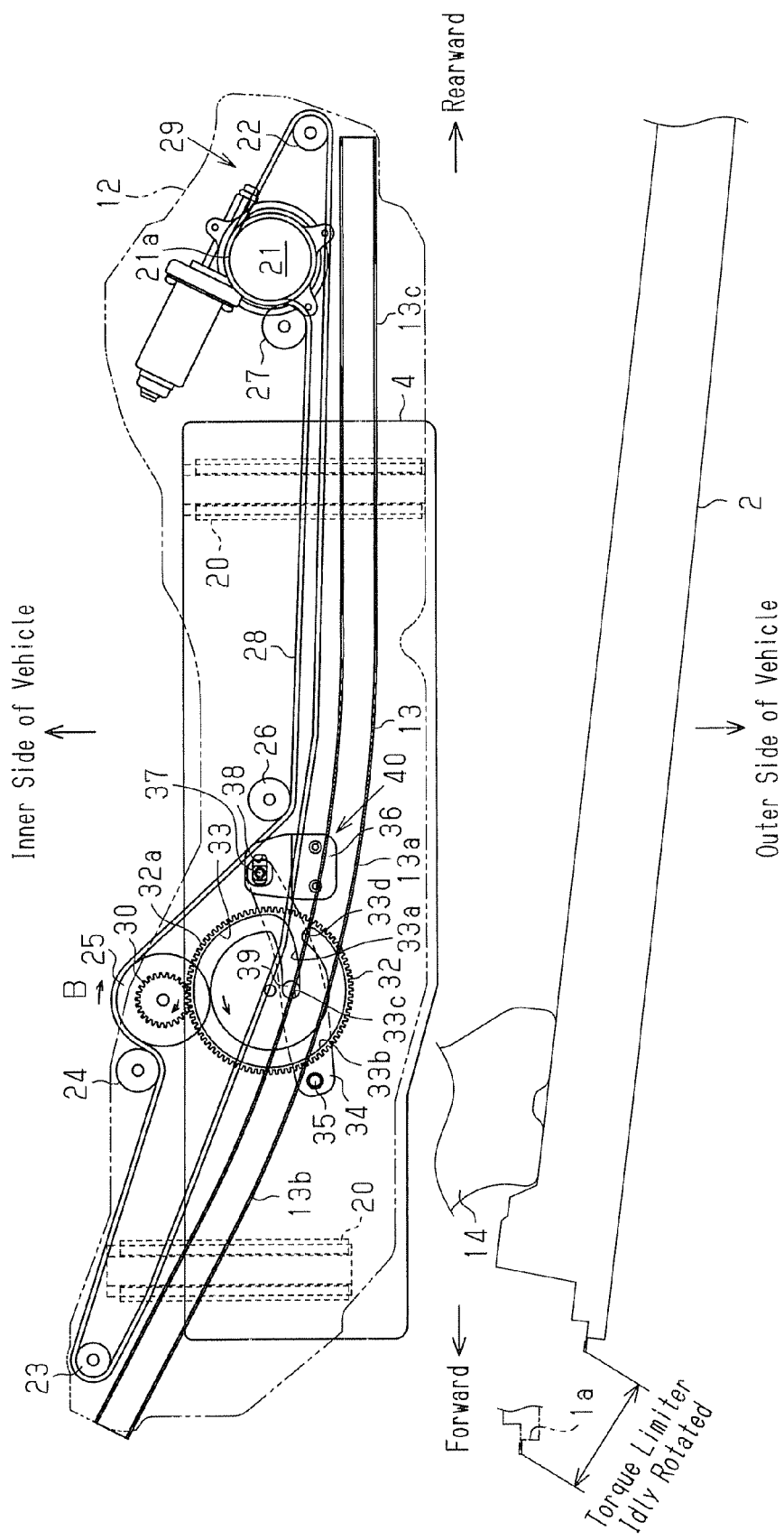
FIG. 17 is a plan view showing the self-reset operation in the step device of FIG. 1.

From this state, when the slide door 2 starts to close, the retraction of the movable step 4 starts at the open/close position at where the door open degree of the slide door 2 is larger than that when a normal operation is performed, as shown in FIG. 16. Thus, the bushing 39 in the groove cam 33 reaches the terminal end 33c of the groove cam 33 (first recess 33a) before the slide door 2 reaches the fully closed position (see FIG. 17). This prevents the plate cam 32 from rotating further, and the torque transmitted to the torque limiter 31 exceeds the fixed value. Thus, the torque limiter 31 starts to idly rotate. The torque limiter 31 continues to idly rotate until the slide door 2 reaches the fully closed position. When the slide door 2 reaches the fully closed position, the relationship between the rotational position of the plate cam 32 (groove cam 33) and the open/close position of the slide door 2 returns to the same relationship as when a normal operation is performed (see FIG. 1). In this state, the torque limiter 31 is idly rotated in a reverse direction by a rotation angle that is the same as the rotation angle by which the torque limiter 31 idly rotated during the opening operation of the slide door 2 (when the projecting operation of the movable step 4 was constrained).

The self-reset function that works when an obstacle (foot, curb, etc.) constrains the retracting operation of the movable step 4 will now be discussed with reference to FIGS. 18 to 20.

Figure 18:
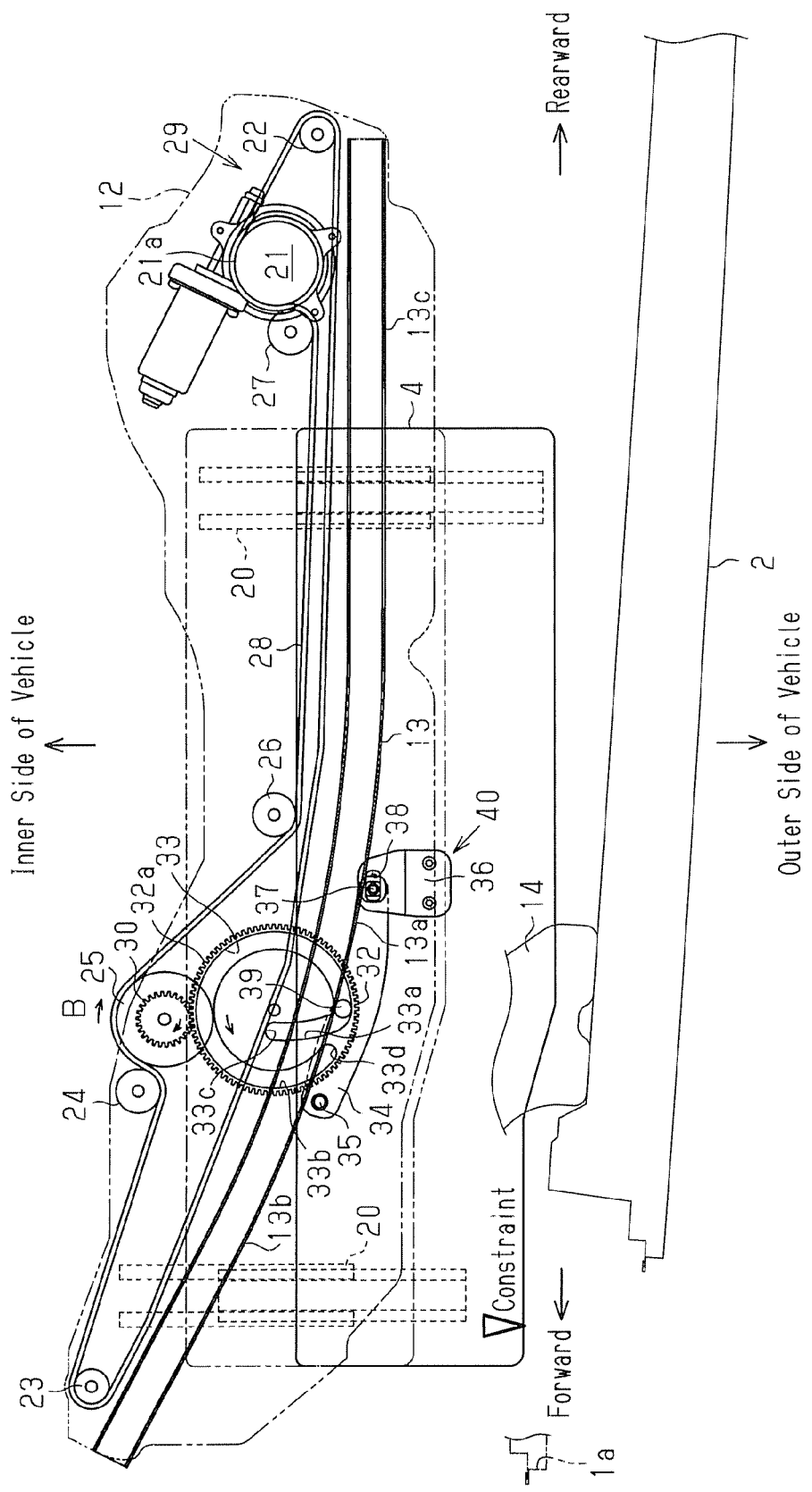
FIG. 18 is a plan view showing the self-reset operation in the step device of FIG. 1.

Referring to FIG. 18, during the retracting operation, when interference with an obstacle produces a load of a certain level or greater and constrains the movable step 4, the torque transmitted to the torque limiter 31, which is arranged between the idle gear 25 and the gear 30, exceeds the fixed value. In this case, the torque limiter 31 idly rotates so as not to affect the closing of the slide door 2.

Figure 19:
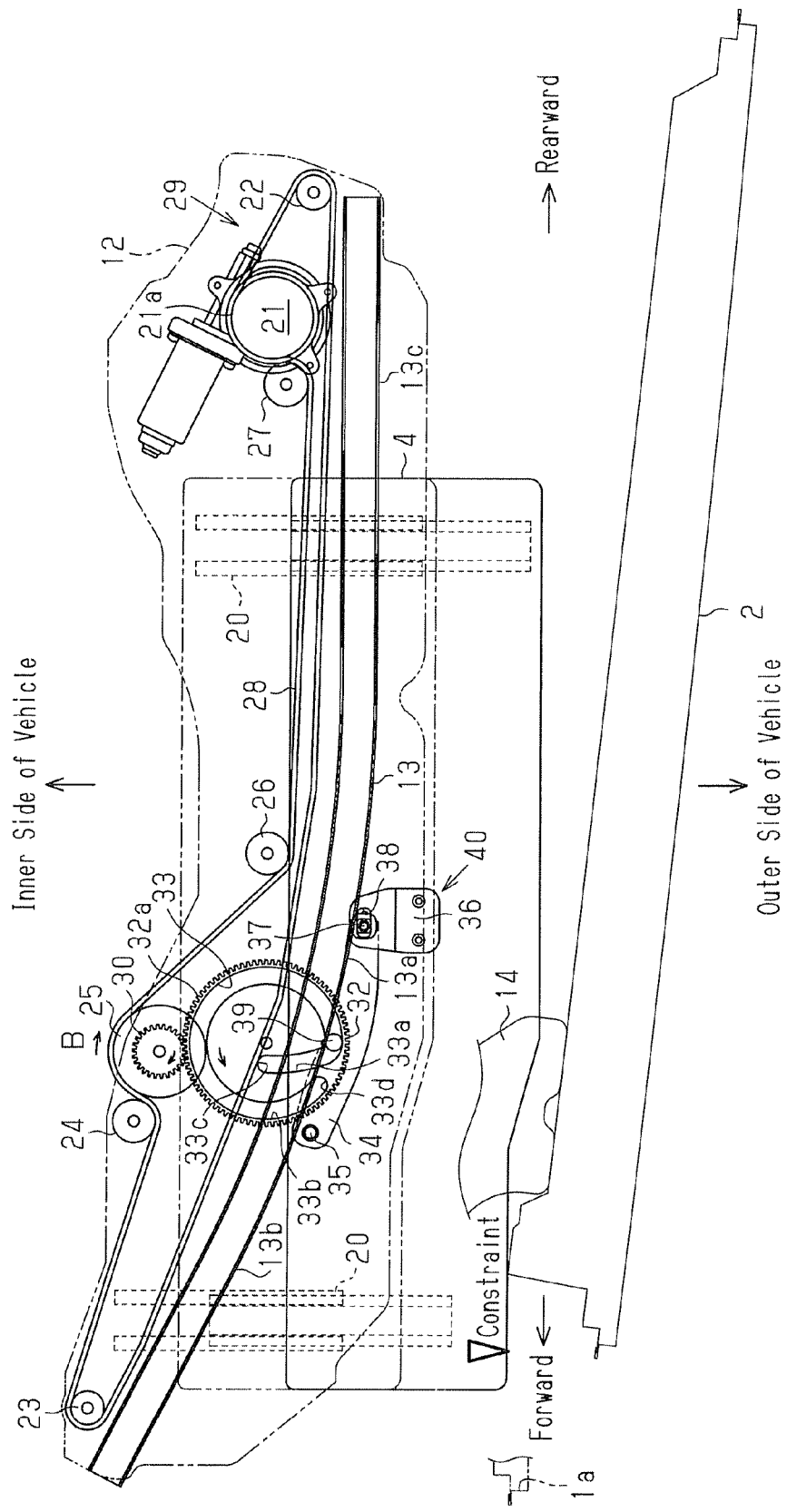
FIG. 19 is a plan view showing the self-reset operation in the step device of FIG. 1.
Figure 20:
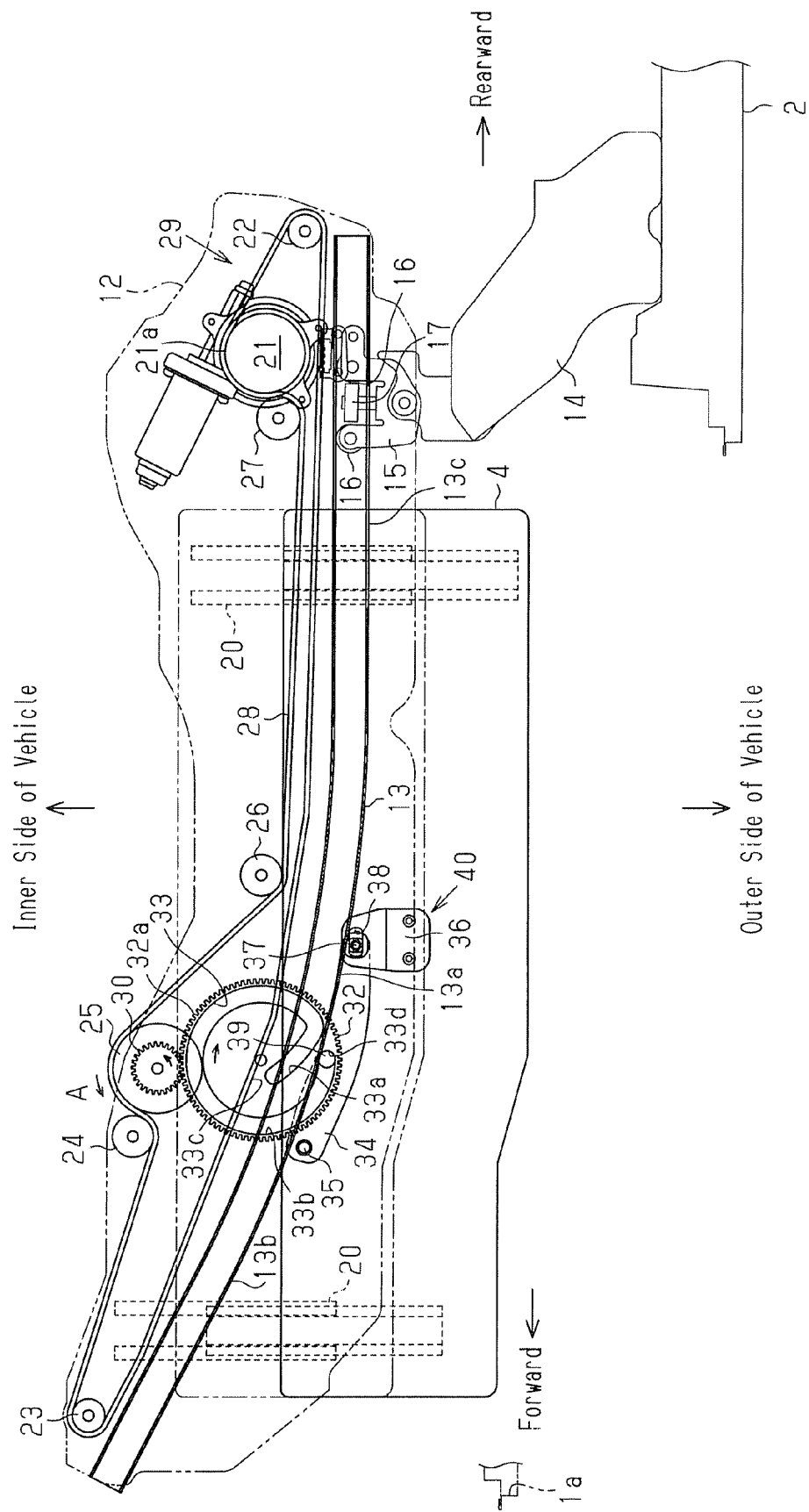
FIG. 20 is a plan view showing the self-reset operation in the step device of FIG. 1.

If the slide door 2 continues to close in a state in which the retraction of the movable step 4 is constrained, the movable step 4 and the slide door 2 interfere with each other (see FIG. 19). In this case, for example, when the jammed state is detected through a jam prevention function, which is related to the open/close control of the slide door 2, the movement of the slide door 2 is reversed toward the opening side. In this state, the relationship between the rotational position of the plate cam 32 (groove cam 33) and the open/close position of the slide door 2 differs from the relationship of when the normal operation is performed. Thus, the bushing 39 in the groove cam 33 reaches the terminal end 33d of the groove cam 33 (second recess 33b) before the slide door 2 reaches the fully open position (see FIG. 20). This prevents the plate cam 32 from further rotating, and the torque transmitted to the torque limiter 31 exceeds the fixed value. Thus, the torque limiter 31 starts to idly rotate. The torque limiter 31 continues to idly rotate until the slide door 2 reaches the fully open position. When the slide door 2 reaches the fully open position, the relationship between the rotational position of the plate cam 32 (groove cam 33) and the open/close position of the slide door 2 returns to the same relationship as when the normal operation is performed (see FIG. 4). In this state, the torque limiter 31 is idly rotated in a reverse direction by a rotation angle that is the same as the rotation angle by which the torque limiter 31 idly rotated during the closing operation of the slide door 2 (when the retracting operation of the movable step 4 was constrained).

As described above, the difference in the rotational position of the plate cam 32 (groove cam 33) and the open/close position of the slide door 2 that occurs during the projecting operation of the movable step 4 is spontaneously resolved (self-reset) by the subsequent closing operation of the slide door 2 to the fully closed position. In the same manner, the difference in the rotational position of the plate cam 32 (groove cam 33) and the open/close position of the slide door 2 that occurs during the retracting operation of the movable step 4 is spontaneously resolved (self-reset) by the subsequent opening operation of the slide door 2 to the fully open position resulting from the interference between the movable step 4 and the slide door 2.

As discussed above in detail, the present embodiment has the advantages described below.

(1) In the present embodiment, the movable step 4 is projected or retracted in mechanical synchronism with the opening or closing of the slide door 2 within the range from the fully closed position to the open/close position, which corresponds to the door open degree (W) at which a passenger cannot get into or out of the vehicle. Accordingly, in comparison with, for example, the vehicle step device disclosed in Japanese Examined Utility Model Publication No 4-3870, the structure is extremely simplified. Furthermore, the slide door 2 and the movable step 4 move in mechanical cooperation. This eliminates the need for a complicated configuration to electrically control the movable step so as to avoid interference with the slide door 2 and reduces costs.

(2) When manually opening or closing the slide door 2, the drive belt 28 moves in accordance with the opening or closing. This rotates the idle gear 25 (gear 30), and the rotation is transmitted to the plate cam 32. Accordingly, even is such a case, the movable step 4 is projected or retracted in cooperation with the opening or closing of the slide door 2 within the range of the predetermined open/close position.

(3) In the present embodiment, the projection/retraction mechanism 40 is formed so as to complete the movement of the movable step 4 (projection or retraction) when the slide door 2 is moving in the range of the predetermined open/close position. Thus, the movable step 4 does not move when the slide door 2 is located at a position where a passenger can get into or out of the vehicle. Thus, a passenger can keep his or her feet stably on the movable step 4. Furthermore, the movable step 4 does not move when the slide door 2 is located at a position where a passenger can get into or out of the vehicle. Thus, the power required to move the movable step 4 can be set without taking into consideration the load of a passenger. This enables the power for moving the movable step 4 to be suppressed. Furthermore, a situation in which a passenger steps onto the moving movable step 4 and suddenly increases the load applied to the slide door 2 during the opening and closing of the slide door 2 is avoided. Thus, for example, when determining whether the slide door 2 has become jammed based on the load applied to the slide door 2 during the opening or closing control of the slide door 2, if a passenger were to step onto the moving movable step 4, this may be determined as an erroneous jamming determination. However, such an erroneous determination is avoided in the present embodiment.

In particular, power transmission is enabled or disenabled between the open/close mechanism 29 and the projection/retraction mechanism 40 by an extremely simple structure in which the plate cam 32, which is rotatably driven by the open/close mechanism 29 (idle gear 25 and gear 30), is engaged with the bushing 39, which is arranged in the projection/retraction mechanism 40 (lever 34). In other words, power transmission is enabled or disabled between the open/close mechanism 29 and the projection/retraction mechanism 40 by an extremely simple structure compared to when using, for example, a link mechanism. The simple structure reduces positional variations of each member and increases the reliability of the operation related to the enabling and disabling of power transmission.

(4) When the movement (projection) of the movable step 4 is completed (see FIG. 10), the bushing 39 may push the plate cam 32 (second recess 32b) due to the load received by the movable step 4. In the present embodiment, the direction in which the pushing force acts (action line) is set to extend through a normal direction of a point of contact between the bushing 39 and the plate cam 32, that is, the rotational axis of the plate cam 32. As a result, moment acting as a force for rotating the plate cam 32 is not produced by the load received by the movable step 4, and the movable step 4 is fixed (self-locked). Such self-locking is achieved with an extremely simple structure that does not require a special locking means. In other words, the movable step 4 is fixed and freed with an extremely simple structure compared to when using a combination of a striker, a latch, a lock lever, and the like in a manner similar to, for example, a door lock mechanism. Thus, the reliability of the operation related to the fixing and freeing of the movable step 4 is improved.

(5) The projection or retraction of the movable step 4 may be disabled due to interference with an obstacle (foot, curb, etc.). In such a case, in the present embodiment, the torque limiter 31 prevents torque exceeding the fixed value from being transmitted from the open/close mechanism 29 (idle gear 25) to the plate cam 32. In other words, when the torque transmitted to the torque limiter 31 exceeds the fixed value, the slide door 2 may still open or close regardless of the movement of the movable step 4. That is, even if the movable step 4 cannot be projected or retracted, the opening and closing of the slide door 2 is basically unaffected. Thus, for example, a passenger may get into or out of the vehicle.

Furthermore, even if the movable step 4 becomes jammed by an object, the torque limiter 31 prevents power exceeding the fixed value from being applied to the jamming object. Thus, excessive load is prevented from being applied to the jamming object. This eliminates the need for a complicated motor control corresponding to such jamming and thereby reduces costs.

In addition, even if the torque limiter 31 idly rotates when interference occurs between the movable step 4 and, for example, an obstacle, the torque limiter 31 is re-connected if such interference is resolved to resume the projection or retraction of the movable step 4. In this case, the projection or retraction of the movable step 4 is completed when the idle rotation of the torque limiter 31 is a fixed amount or less.

(6) In the present embodiment, the torque limiter 31 has a self-reset function for rearranging the bushing 39 so that the position of the bushing 39 (rotational position of plate cam 32) has a constant relationship with the open/close position of the slide door 2. Thus, the step 4 is stably operated. For example, even if the relationship between the open/close position of the slide door 2 and the projected position of the movable step 4 becomes different, the torque limiter 31 idly rotates and the above positional relationship is automatically returned to the normal state by moving the slide door 2 again to the fully open position or the fully closed position. That is, the above positional relationship is easily returned to the normal state.

(7) In the present embodiment, a hollow space S2, which is formed near the feet of a passenger who is sitting on the seat 5, is sufficiently small. Thus, the passenger is not forced to take an unnatural seating position, and luggage held in the passenger compartment does not easily fall into the hollow space S2.

The above-described embodiment may be modified as described below.

In the above-described embodiment, the structure of the projection/retraction mechanism 40 is only an example. The bushing 39 may be fastened to the bracket 36 so as to directly project or retract the movable step 4 with the bracket 36 (bushing 39) as the plate cam 32 (groove cam 33) rotates.

In the above-described embodiment, the structure of the open/close mechanism 29 is only an example. For example, a suitable pulley may be used in lieu of the output gear 21a and the idle gears 22 to 27.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A step device for a vehicle including a movable step arranged in a doorway that is opened and closed by a door, the step device comprising:
   an electrical drive source;
   a first transmission mechanism which transmits power from the electrical drive source to the door and opens or closes the door;
   a second transmission mechanism which transmits power from the electrical drive source to the step through the first transmission mechanism and moves the step; and
   a plate cam rotated by the first transmission mechanism and engaged with a follower arranged in the second transmission mechanism to enable or disable power transmission between the first and the second transmission mechanisms;
   wherein the plate cam includes:
   a first cam portion which pushes the follower during rotation of the plate cam when the door is in a range of a predetermined open/close position to enable or disable power transmission between the first and the second transmission mechanisms; and
   a second cam portion which frees the follower from the pushing during rotation of the plate cam and disables power transmission between the first and the second transmission mechanisms when the door is outside the range of the predetermined open/close position.

2. The step device according to claim 1, wherein:
   the first cam portion is a first recess which extends such that a radial distance from a rotational axis of the plate cam varies along the circumferential direction; and
   the second cam portion is a second recess which extends in an arcuate manner such that the radial distance from the rotational axis of the plate cam is constant along the circumferential direction.

3. The step device according to claim 2, further comprising:
   a torque limiter which limits torque that is transmissible from the first transmission mechanism to the plate cam to a fixed value.

4. The step device according to claim 3, wherein the follower is set to be arranged at a terminal end of the first cam portion when the vehicle door is located at a fully closed position and set to be arranged at a terminal end of the second cam portion when the vehicle door is located at a fully open position.

5. The step device according to claim 1, further comprising:
   a torque limiter which limits torque that is transmissible from the first transmission mechanism to the plate cam to a fixed value.

6. The step device according to claim 5, wherein the follower is set to be arranged at a terminal end of the first cam portion when the vehicle door is located at a fully closed position and set to be arranged at a terminal end of the second cam portion when the vehicle door is located at a fully open position.

7. The step device according to claim 1, wherein the follower engages the plate cam so that distance from a rotational axis of the plate cam varies as the plate cam rotates, and the step moves as the distance between the follower and the rotational axis of the plate cam varies.

8. The step device according to claim 1, wherein the range of the predetermined open/close position is a range of positions of the door in which a passenger cannot get into or out of the vehicle.

* * * * *